US 8,261,124 B2

(12) United States Patent
Carmichael

(10) Patent No.: US 8,261,124 B2
(45) Date of Patent: Sep. 4, 2012

(54) SYSTEM AND METHOD FOR OPTIMIZED ERROR CORRECTION IN FLASH MEMORY ARRAYS

(75) Inventor: Richard Carmichael, Phoenix, AZ (US)

(73) Assignee: Spansion LLC, Sunnyvale, CA (US)

(*) Notice: Subject to any disclaimer, the term of this patent is extended or adjusted under 35 U.S.C. 154(b) by 1111 days.

(21) Appl. No.: 11/963,078

(22) Filed: Dec. 21, 2007

(65) Prior Publication Data
US 2009/0164836 A1 Jun. 25, 2009

(51) Int. Cl.
G06F 11/00 (2006.01)
G06F 11/16 (2006.01)

(52) U.S. Cl. .................... 714/6.24; 714/6.1; 714/6.2

(58) Field of Classification Search .......... 714/5, 6, 714/758, 6.1, 6.11, 6.2, 6.24
See application file for complete search history.

(56) References Cited

U.S. PATENT DOCUMENTS

| | | | | |
|---|---|---|---|---|
| 5,220,569 A * | 6/1993 | Hartness | ........................ | 714/758 |
| 5,835,509 A * | 11/1998 | Sako et al. | ..................... | 714/755 |
| 6,715,122 B2 * | 3/2004 | Carson et al. | .................. | 714/769 |
| 6,748,488 B2 * | 6/2004 | Byrd et al. | ..................... | 711/114 |
| 2005/0120262 A1 * | 6/2005 | Dandrea | ........................... | 714/6 |
| 2006/0156211 A1 * | 7/2006 | Edirisooriya et al. | ........ | 714/800 |
| 2007/0150790 A1 * | 6/2007 | Gross et al. | .................. | 714/763 |
| 2008/0059865 A1 * | 3/2008 | Gopal et al. | .................. | 714/770 |
| 2008/0086676 A1 * | 4/2008 | Mead | ........................... | 714/758 |
| 2008/0282105 A1 * | 11/2008 | Deenadhayalan et al. | ......... | 714/6 |
| 2010/0169577 A1 * | 7/2010 | Kiyota | .......................... | 711/125 |

OTHER PUBLICATIONS

How RAID-5 Really Works by Scott Klarr published Dec. 11, 2007 http://www.scottklarr.com/topic/23/how-raid-5-really-works/.*
ECC by PCGuide.com published Apr. 17, 2001 http://www.pcguide.com/ref/ram/errECC-c.html.*
What is ECC by Rene Martinez published Jul. 26, 2001 http://searchnetworking.techtarget.com/sDefinition/0,,sid7_gci22028,00.html.*
RAID by George Hernandez version from Nov. 21, 2007, found via the WayBack Machine http://web.archive.org/web/20071121071723/http://www.georgehernandez.com/h/xComputers/Enterprise/RAID.asp.*

* cited by examiner

Primary Examiner — Joseph Schell
(74) Attorney, Agent, or Firm — Turocy & Watson, LLP

(57) ABSTRACT

Systems and/or methods that facilitate that facilitate error correction of data stored in memory components, such as flash memory devices are presented. An optimized correction component can be used to break data into two or more data blocks. The optimized correction component can facilitated creating one or two redundancy blocks that can be associated with the data blocks, wherein data blocks and the redundancy blocks can be assembled into a data stripe that can be stored in three or more of the memory components. Upon retrieval of the data stripe, the optimal correction component, an error correction code (ECC) component or a combination thereof can correct data blocks that contain errors wherein the decision whether the optimized correction component or the error correction code (ECC) component corrects the errors can be based in part on a predetermined criteria.

18 Claims, 12 Drawing Sheets

SYSTEM AND METHOD FOR OPTIMIZED ERROR CORRECTION IN FLASH MEMORY ARRAYS

TECHNICAL FIELD

The subject innovation relates generally to memory systems and in particular, to systems and/or methodologies that can facilitate expedient reading of data from memory devices.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

As flash memory devices have continued to evolve, the density of data stored in such devices has increased. With the increasing density and amount of data stored that can be stored in flash devices, read errors can become an issue due in part to the close proximity of read threshold levels. Further, as erase cycles increase, read errors may occur more frequently. Typically, an error correction code (ECC) can be implemented to facilitate maintaining the accuracy and reliability of memory components, such as flash memory. ECC can detect errors in data that is read from memory components, and the ECC can also have the ability to correct the data (e.g., by reconstructing the data that contains the error into the original error-free data). Depending on the ECC algorithm used to detect and correct errors that can be associated with the data in the memory components, it can take from tens of clock cycles to tens of thousands of clock cycles to correct the data that has errors. Often times, there can be a correlation between the number of errors within a given block of data and the number of clock cycles required for an ECC to correct the errors (e.g., as the number of errors in a given block go up, the number of clock cycles to correct all of the errors can go up as well). As a result, a system requesting data from one or more memory components can wait for a relatively long period of time (e.g., thousands of clock cycles) until an ECC component corrects the requested data (e.g., particularly if there are a lot of errors associated with the data).

It is desirable to be able to implement error correction in memory components in a manner that allows for quicker reads of data from components associated with a system when the data being retrieved has errors. In addition, it is desirable to be able to reconstruct data that can be lost due to errors and/or a defect associated with a memory component (e.g., the memory component or a portion thereof becomes defective).

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Traditionally, a common way of improving the reliability of memory components has been to use error correction code (ECC) which can detect and correct data errors. However, although the ECC can provide the benefit of detecting and correcting errors associated with a memory component, it can require a relatively long period time to correct the errors, and thus, it can result in an overall longer read cycle when the data being retrieved has errors. For example, depending on the number of errors associated with a particular read, it can require a significant number of clock cycles (e.g., more than 20,000 clock cycles) to correct data errors using ECC, which can result in a slow read performance (e.g., if there are a large number of data errors that need corrected). In addition to ECC being relatively inefficient (e.g., requiring a high number of clock cycles to correct errors) when reading data that has a high number of data errors, ECC can be limited in regards to the maximum number of errors that can be corrected for a given block of data. For example, some ECC components can only repair a block of data that has sixteen or less data errors within a 1 kilobyte (KB) block. In some instances, for example, if a one KB block of data has more than sixteen errors, data can be lost.

In one embodiment of the disclosed subject matter, a memory controller component can be associated with Y+1 memory components to make a memory array. In one aspect, Y can be a positive integer that can represent the number of memory components that a system desires for data storage and the additional memory component can be used to store redundancy information (e.g., a parity block) associated with the data stored in the other memory components. For example, if a system desires four memory components to be associated with a memory array, an additional memory component can be added to the array, wherein the fifth memory component can be used to facilitate storing redundancy information. The redundancy information can, for example, be stored across all of the memory components in a rotating parity stripe. In one aspect, the redundancy information can be used to facilitate quickly correcting errors that can be associated with data contained in one of the memory components, particularly when a block of data has a high number of errors. In another aspect, the additional memory component used to facilitate storing redundancy information across the memory array can help facilitate rebuilding data associated with a memory component that becomes defective or fails.

In accordance with one aspect of the disclosed subject matter, an optimized correction component can be implemented to break data to be written to memory into chunks of data (e.g., into data blocks). A bit-wise XOR function can be performed on the data blocks to formulate a redundancy or parity block, wherein the data blocks and the parity block can be referred to as a stripe of data. In accordance with one aspect of the disclosed subject matter, the data that is read from data blocks that contain errors can be corrected by performing a series of bit-wise XOR operations between the data contained in the remaining good data blocks and the parity block associated with a memory stripe. The XOR operations can be performed in parallel (e.g., in hardware), and thus can result in faster data reads when there are errors associated with the data.

One of the advantages of using the redundancy or parity block to fix errors associated with a data block is it can require less time to correct the errors compared to traditional ECC components, particularly in the case where the data read is associated with a relatively large number of data errors. Further, by using an optimized correction component along with the additional memory component, a higher number of errors can be corrected as compared to using an ECC component(s), for example. In one aspect, one of the memory components associated with a system can be replaced (e.g., if it becomes defective) while the optimized correction component can rebuild the data that is associated with a defective memory component, for example.

In another embodiment of the disclosed subject matter, two additional memory components can be added to a memory controller component. For example, a system can include Y+2 memory components that can comprise a memory array. In one aspect, the Y can be a positive integer that represents the number of memory components that a system desires for data storage and the additional (e.g., the +2) memory components can be used to store redundancy information associated with the data stored in the other memory components. In one aspect, an optimized correction component can perform a bit-wise XOR operation on two or more good data to generate a "parity block", and the optimized correction component can also perform linear operations such as, for example, the Galois field (GF) (e.g., using Reed-Solomon (RS)) to generate a "Q block".

The use of two additional memory components used to facilitate storing two sets of redundancy information (e.g., the parity block and the Q block) can allow for a more expedient read of data from memory components that is associated with one or two data blocks that contain data that with one or more errors. In accordance with one aspect of the disclosed subject matter, when a stripe of data is read from memory (e.g., from Y+2 memory components), the optimized correction component can make the determination that it can be more efficient to reconstruct the data using the XOR and GF operations rather than allowing an ECC component to correct the data (e.g., by using the parity block and the Q block). Another advantage to the using the two additional memory components to store redundancy information is that data can be recovered from memory components that become defective. In one aspect, the memory array can continue to be used while the data is being rebuilt and/or when the defective memory component is being replaced (e.g., in systems that can accommodate memory components to be replaced when the memory controller component and the associated memory components are still connected to a power source). Further, when two additional memory components are utilized to store redundancy information (e.g., a parity block and a Q block), the optimized correction component can facilitate rebuilding data associated with up to two memory components that become defective. It is to be appreciated that, for the sake of brevity, the details of the GF field and the RS equation to generate redundancy information are not specifically described herein, and are known by those of skill in the art.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
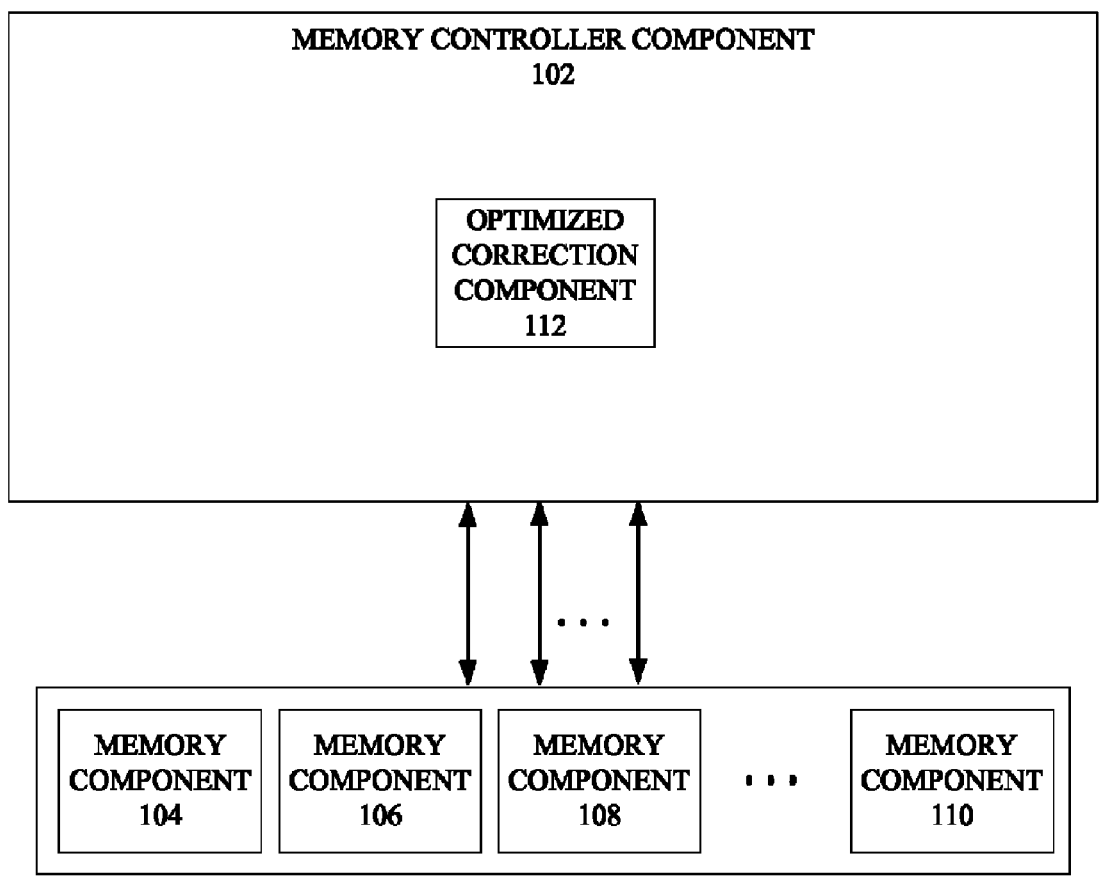
FIG. 1 illustrates a block diagram of a system that can facilitate reading data and correcting errors that can be contained in the data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

The size of memory components (e.g., flash memory) have grown in part because of the higher density and lower cost associated with these components. Furthermore, flash components have become more popular because of their speed, low noise, low power consumption, and reliability. As these devices have become smaller and more popular, it is becoming increasingly affordable to utilize these components as main storage units for many types of systems. For example, because of the reduction in size of these memory components, memory controllers can be built with the ability to support larger and more numerous memory components. With the possibility of using larger and a higher number of memory components associated with a memory controller component, it can be desirable to facilitate a more efficient way of correcting data errors, particularly when there are a high number of errors associated with a particular read. In addition, it can be desirable to be able to rebuild lost data associated with a memory component that has become defective (e.g., when memory components contain crucial information for a system).

The disclosed subject matter relates to systems and/or methods that facilitate error correction of data stored in a memory, such as a flash memory device (e.g., multi-level, multi-bit flash memory device, single-bit flash memory device). In accordance with one aspect of the disclosed subject matter, memory components can be added to a system to help facilitate correcting the data errors. The increased number of memory components can be used to store information that can be used to facilitate recovery of all data in the case where one or more memory components fail, for example. In accordance with one aspect of the disclosed subject matter, an optimized correction component can be used to break data that is to be written to the memory components into data blocks. In one aspect, the optimized correction component can facilitate creating a parity block (e.g., redundancy information) that can be associated with the data blocks. The optimized correction component can, for example, perform a series of bit-wise XOR functions on the data blocks via a parity component to generate the parity block. The parity block can, for example, be distributed along with the other data blocks into the memory components associated with the memory controller component to create a data stripe (e.g., the data blocks and parity block can be referred to as a data stripe).

Upon reading the data stripe back from the memory components, data errors (if any) can be repaired by performing consecutive bit-wise XOR operation on the data blocks and the parity block to recover the lost data. Another way of generating recovery information from data can be to use linear operations such as, for example, the Galois field (GF) associated with the Reed-Solomon coding scheme.

Turning to the figures, FIG. 1 illustrates a system 100 that can facilitate reading data and correcting errors that can be contained in the data, in accordance with an aspect of the subject matter. System 100 can include a memory controller component 102 that can be a control engine that can facilitate sending and receiving data and commands to a memory array (e.g., by generating the pin protocol) of a memory component. The memory controller component 102 can be associated with a memory component 104, memory component 106, memory component 104, memory component 110 (hereinafter also referred to as "memory components 104 through 110"). The memory components 104 through 110 can be used to store data, and can include nonvolatile memory (e.g., flash memory) and/or volatile memory (e.g., static random access memory (SRAM)). In accordance with one aspect of the disclosed subject matter, the memory controller component 102 can represent a data transmission system for different types of electronic devices such as, for example, cellular phones, smart cards, personal digital assistants (PDAs), electronic games, electronic organizers, as well as a multitude of other electronic devices. In another aspect, the memory controller component 102 can represent a controller for a mass storage device such as, for example, thumb drives or smart cards. It is to be appreciated that the disclosed subject matter is not delimited to systems and/or devices that the memory controller component 102 can be associated with as described herein, for the disclosed subject matter contemplates that the memory controller component 102 can be associated with other types of systems and/or memory devices as well.

Typically, a memory controller component 102 can be associated with one or more error correction code (ECC) components (not shown) to facilitate correcting data errors that can be associated with memory components (e.g., memory components 104 through 110). ECC components can be employed in a memory controller component 102 to cope with charge loss/gain mechanism that can be associated with memory components 104 through 110, wherein the memory components 104 through 110 are flash devices, for example. However, implementing ECC in memory controller component 102 to correct errors in data associated with flash devices can be problematic, as it can require a significant amount of time to correct data errors. In particular, ECC components can require a significant amount of time to correct data errors if there are a high number of errors associated with a particular data read. As a result, using conventional ECC components alone to correct data can result in the memory controller components being less desirable to users (e.g., consumers).

To facilitate alleviating some of the time required to correct data that has a high number of errors, the system 100 can employ an optimized correction component 112. The optimized correction component 112 can facilitate breaking up data to be written to the memory components 104 through 110 into data elements or data blocks wherein the data blocks can be written across (e.g., distributed) the plurality of memory components 104 through 110 (e.g., across the memory array) associated with the memory controller component 102. In essence, the optimized correction component 112 can facilitate splitting the data to be written evenly across the memory components 104 through 110 (hereinafter data blocks associated with a particular read can also referred to as a "data stripe"). In addition, the optimized correction component 112 can facilitate generating parity information that can be included in each data stripe. A parity block can be redundant information that can be associated with respective data blocks in a data stripe, wherein the parity block can be used to facilitate error correction of the respective data blocks if the data blocks contain an error(s), for example. The optimized correction component 112 can ensure that the parity information (hereinafter also referred to as a "parity block") can be substantially evenly distributed across all of the memory components 104 through 110 (e.g., when viewing all of the data stripes contained in the memory components in the aggregate). For example, the optimized correction component 112 can facilitate storing a parity block associated with a first data stripe into the memory component 104. For a second data stripe, the optimized correction component 112 can facilitate storing a parity block associated with a second data stripe into memory component 106, for example. The distribution the parity blocks across the memory components 104 through 110 is explained further herein, for example, in reference to system 200 and system 300.

In accordance with one aspect of the disclosed subject matter, the parity block can be generated by using a bit-wise XOR function on the data blocks associated with a particular data stripe. The bit-wise XOR of the data blocks can formulate a redundancy within the data that can be spread-out over all of the memory components 104 through 110, wherein the data can be reconstructed or errors can be corrected if one of the data blocks associated with one of the memory components 104 through 110 contains data that has one or more errors. In accordance with one aspect of the disclosed subject matter, a data block that contains data that has errors can be corrected by performing a series of bit-wise XOR operations between the remaining data blocks that contain data that does not contain errors and the redundancy data contained in the parity block associated with the data stripe. In one aspect, the XOR operations can be performed in parallel which can result in more efficient data reads when the data contains errors.

By using the redundancy or parity blocks associated with a data stripe to facilitate correcting errors associated with data in a data block, reading data from the memory components 104 through 110 can take a smaller amount of time than if an ECC component, for example, is employed to correct the errors. For example, it can take up to 20,000 clock cycles for an ECC component to correct a data block that has, for example, sixteen errors. Conversely, in accordance with the subject innovation, it can take only a few clock cycles for the optimized correction component to facilitate performing the error corrections on data associated with a data block that contains the same number of errors.

In accordance with one aspect of the disclosed subject matter, the ECC component can facilitate the determination of whether or not one or more of the data blocks being read (e.g., within a data stripe) from memory components 104 through 110 contains an error. Further, an ECC component can, for example, facilitate determining how many errors, if any, a particular data block contains. In one aspect, if there are errors associated with the data in a particular data block, either the optimized correction component 112 can correct the data or another form of error correction tool can be implemented (e.g., an ECC component) to correct the data. The optimized correction component 112 can, for example, correct the errors of the data contained in a data block associated with a data stripe when a predetermined criteria is met. For example, the optimized correction component 112 can correct errors associated with data in a particular data block when the number of errors surpasses a predetermined threshold level. In one aspect, it can be more efficient to allow another error correction tool (e.g., an ECC component) to correct errors associated with the data in a particular data block. For example, it can more efficient to facilitate having an ECC component perform the error correction(s) (e.g., as opposed to the optimized correction component 112) if the data block contains data that has only one or two errors.

In accordance with one aspect of the disclosed subject matter, the optimized correction component 112 can correct a higher number of errors associated with data contained in a data block than, for example, an ECC component. For example, all of the data associated with a particular data block (e.g., a data block that is associated with one of the memory components 104 through 110 that has become defective) of a particular data stripe can be repaired by allowing the optimized correction component 112 to reconstruct the data by utilizing the parity block and the other error-free data blocks associated with the data stripe. In contrast, some error correction techniques (e.g., ECC), can be limited in regards to the number of errors that can be corrected for data in a given data block.

Figure 2:
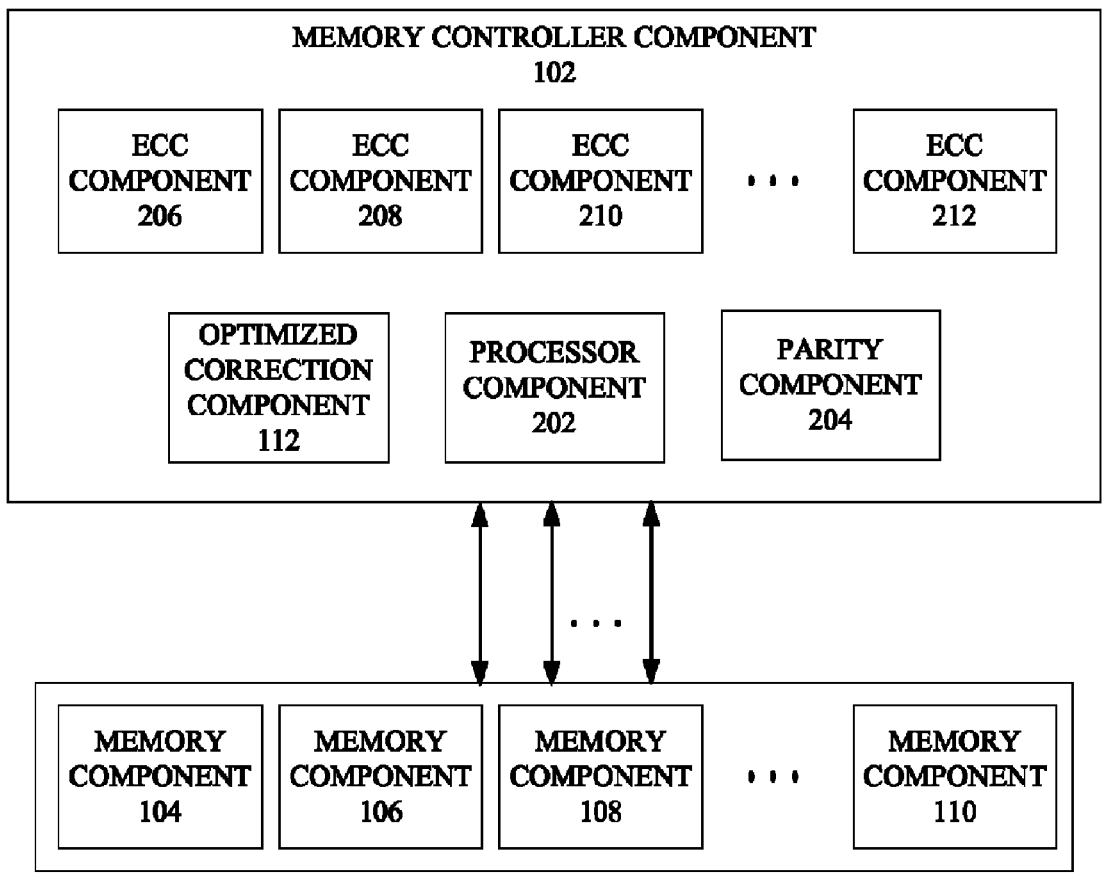
FIG. 2 depicts a block diagram of a system that can facilitate correcting data errors that can be associated with one memory component in accordance with an aspect of the disclosed subject matter.

Referring to FIG. 2, depicted is a system 200 that depicts a block diagram of a system that can facilitate generating redundancy information associated with a memory array, in accordance with an aspect of the disclosed subject matter. System 200 can include a memory controller component 102, an optimized correction component 112, and memory components 104 through 110 that can have the same or substantially the same functionality as described supra, for example, with regard to system 100.

The memory controller component 102 can facilitate controlling data flow to and from the memory components 104 through 110. The memory controller component 102 can be associated with a processor component 202 that can be a typical applications processor that can handle communications and run applications, for example. The processor component 202 can be utilized by a computer, a mobile handset, PDA, or other electronic device, for example. The processor component 202 can also generate commands, including read, write, and/or erase commands, in order to facilitate reading data from, writing data to, and/or erasing data from the memory controller component 102 and/or the optimized correction component 112, for example. In one aspect, the communication of information between processor component 202 and the memory controller component 102 can be facilitated via a bus (not shown). The bus can include of any of several types of bus structure(s) including the memory bus or memory controller, a peripheral bus or external bus, and/or a local bus using any variety of available bus architectures including, but not limited to, Advanced Microcontroller Bus Architecture (AMBA), Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system 200 can include a parity component 204 that can facilitate creating redundancy information for data that can be written to the memory components 104 through 110. In accordance with one aspect of the disclosed subject matter, the optimized correction component 112 can receive data from the processor component 202 via the bus to be sent to one of the memory components 104 through 110. The optimized correction component 112 can divide the data into Y−1 data blocks that can be associated with a data stripe, wherein the Y can be a positive integer that can represent the number of memory components associated with the memory controller component 102 (e.g., saving one memory component to store redundancy information). It is to be appreciated that although system 200 depicts four memory components associated with the memory controller component 102 (e.g., memory components 104 through 110), that the disclosed subject matter contemplates that the memory controller component 102 can be associated with three to virtually any number of memory components. It is also to be appreciated that the optimized correction component 112 and/or the processor component 202 can facilitate adjusting the number of data blocks to accommodate the three to virtually any number of memory components that can be associated with the memory controller component 102 as well.

The system 200 can also include a parity component 204 wherein the parity component 204 can generate a parity block. For example, the parity component 204 can calculate the parity of the data blocks associated with a data stripe the optimized correction component 112, the processor component 202 or a combination thereof can assemble. In accordance with one aspect of the disclosed subject matter, the parity component 204 can generate the parity block by using a bit-wise XOR function on the data blocks associated with a particular data stripe. For example, if a data stripe is associated with three data blocks, the optimized correction component 112 can instruct the parity component 204 to facilitate performing a bit-wise XOR of the bits associated with the first data block and the second data block to produce an intermediate result. The optimized correction component 112 can then instruct the parity component 204 to facilitate performing another bit-wise XOR operation between the intermediate result and the third data block associated with the data stripe. The final result of the XOR between the intermediate result and the third data block can be used as the parity block, for example. The bit-wise XOR of the data blocks can formulate a redundancy within the data that can be spread-out over all of the memory components 104 through 110, wherein the data can be reconstructed or errors can be fixed if data in one of the data blocks associated with one of the memory components 104 through 110 contains one or more errors.

It is to be appreciated that that the disclosed subject matter contemplates that less than, equal to, or more than three memory components can be associated with the memory controller component 102 and that the optimized correction component 112 can facilitate performing additional XOR functions to accommodate additional data blocks to complete a data stripe. For example, the optimized correction component 112 can perform Y−1 XOR operations wherein Y can range from two to virtually any number of memory components associated with a particular memory controller component 102.

In accordance with one aspect of the disclosed subject matter, data in a data block that contains an error(s) can be corrected by performing a series of bit-wise XOR operations between the remaining data in the data blocks that do not contain errors and the redundancy data contained in the parity block associated with a particular data stripe. For example, if there are three memory components associated with a memory controller component 102, the optimized correction component 112 in conjunction with the parity component 204 can repair the data one of the data blocks should the data one of the data blocks contain an error. Upon a data read, the optimized correction component 112 can, for example, facilitate reading a data stripe from memory components 104 through 110. It is to be appreciated that a data stripe can include a data block from each of the memory components (e.g., memory components 104 through 110) associated with the memory controller component 102. If, for example, the data in second data block contains errors, the optimized correction component 112 can facilitate (e.g., via the parity component 204) performing a bit-wise XOR function between the first data block and the third data block to produce an intermediate result. The optimized correction component 112 can facilitate performing an XOR between the intermediate result and the parity block associated with the data stripe to produce a final result. The final result can contain the equivalent data that was originally stored in the second data block. The optimized correction component 112, the processor component 202, or a combination thereof, can facilitate presenting the corrected data stripe (e.g., containing the first data block, the rebuilt second data block, and the third data block) to a system (not shown) requesting the data via a bus (not shown), for example.

The system 200 can also include ECC (error correction code) component 206, ECC component 208, ECC component 210, ECC component 212 (hereinafter also referred to as "ECC components 206 through 212"). In accordance with one aspect of the disclosed subject matter, the memory controller component 102 can use one or more ECC components (e.g., ECC components 206 through 212) to facilitate correcting data that can be read from one or more memory components (memory components 104 through 110). The ECC components 206 through 212 can contain error correction functions that can be utilized to correct one or more errors that can be associated with the data one or more of the data blocks contained within a data stripe. It is to be appreciated that, depending on the ECC function an ECC component uses to detect and correct errors, it can take from tens of clock cycles to tens of thousands of clock cycles to correct the data that has errors. For instance, there can be a correlation between the number of errors within the data of a given block of data and the number of clock cycles required for an ECC component to correct the errors (e.g., as the number of errors in that data of a given block go up, the number of clock cycles to correct all of the errors can go up). As a result, when the memory controller component 102 requests data from one or more memory components, the memory controller component 102 can wait a relatively long period of time (e.g., thousands of clock cycles) until the ECC component corrects the requested data. For example, if one error is associated with the data of a particular data stripe, there may not be an appreciable time delay for one or more of the ECC components 206 through 212 to correct the data. However, if for example there are sixteen errors associated with the data of a particular data stripe, then there can be a relatively long time delay while the ECC components 206 through 212 correct the data (e.g., it can take more than 20,000 clock cycles for some ECC components to correct the sixteen errors).

Another limitation regarding using the ECC components 206 through 212 to correct data associated with a data stripe is that the ECC components 206 through 212 may only be able to correct a finite number errors that can be associated with the data of a particular data block. For example, the ECC components 206 through 212 may only be able to correct up to sixteen errors that are associated with a data block that contains 1 kilobyte (KB) of data. If, for example, there are more than sixteen errors associated with the 1 KB data block, the ECC components 206 through 212 might be unable to successfully perform the data corrections associated with that data block. A situation wherein more than sixteen or more errors can occur within the data of a given data block can be, for example, when one of the memory components 104 through 110 fails. In a conventional system where the ECC components 206 through 212 alone (e.g., without an optimized correction component 112 and/or parity component 204) are used to correct the data associated with the memory components 104 through 110, the data contained within the memory component that fails can be lost. In contrast, with regard to the subject innovation, the optimized correction component 112, processor component 202, parity component 204, or combination thereof, can facilitate correcting or rebuilding the data associated with a memory component with virtually no limit to the number of errors that can be corrected with regard to data of a particular memory component. For example, the optimized correction component 112, processor component 202, parity component 204, or combination thereof, can facilitate correcting or rebuilding all or virtually all of the data associated with a particular memory component (e.g., in the event that the memory component fails).

In accordance with one aspect of the disclosed subject matter, one or more of the ECC components 206 through 212 can be employed to facilitate determining whether the optimized correction component 112 can be enabled or disabled with regard to correcting data (e.g., a data stripe) being read from the memory components 104 through 110. In accordance with one aspect of the disclosed subject matter, the ECC components 206 through 212 can employ an indicator bit(s) that can be associated with the optimized correction component 112 to indicate that the optimized correction component 112 is to be enabled to perform the error corrections with regard to the data of a particular data stripe read. For example, an indicator bit can be set to a "1" to indicate that the optimized correction component 112 is to perform the error correction associated with the data of a particular data stripe, and the indicator bit can be set to a "0" to indicate that one or more of the ECC components 206 through 212 is to perform the error correction associated with reading the data in a particular data stripe. In accordance with another aspect of the disclosed subject matter, the optimized correction component 112 can make the determination of whether one or more of the ECC components 206 through 212 or the optimized correction component 112 will correct the errors associated with the data of a particular data block. In such an aspect, the optimized correction component 112 can furnish an indicator bit to one or more of the ECC components 206 through 212 to indicate which component (e.g., one of the ECC components 206 through 212 or the optimized correction component 112) will perform the error corrections.

In accordance with one embodiment of the disclosed subject matter, one or more of the ECC control components 206 through 212 can, for example, make an analysis as to whether it can be more efficient for the optimized correction component 112 to perform data correction or the ECC components 206 through 212 to perform the data correction regarding the data blocks associated with a particular data stripe based on a predetermined criteria. For example, the optimized correction component 112 and/or the processor component 202 can be programmed to perform error corrections via the optimized correction component 112 (e.g., as opposed to one or more of the ECC components 206 through 212) if a piece of data in a data block associated with a data stripe has a number of errors that is at or more than a predetermined threshold number of errors (e.g., seven data errors). If, for example, a piece of data in a data block contains a number of data errors that is at or more than a predetermined threshold number of data errors, the optimized correction component 112 can facilitate correcting the data errors via the use of the redundancy information contained within the plurality of data blocks and parity block associated with the data stripe (e.g., as explained herein using a series of XOR functions to regain the original information contained within the data block that contains the errors). If, for example, the data block contains less than the predetermined threshold number of errors, one or more of the ECC components 206 through 212 can facilitate correcting the errors contained within the data block. It is to be appreciated that by choosing an optimal way of correcting errors that can be associated with the data of a data block (e.g., via the optimized correction component 112 or via one or more of the ECC components 206 through 212), the overall time to correct the errors associated with the data of the data block can be reduced thus resulting in an overall system efficiency improvement regarding a read operation.

Figure 3:
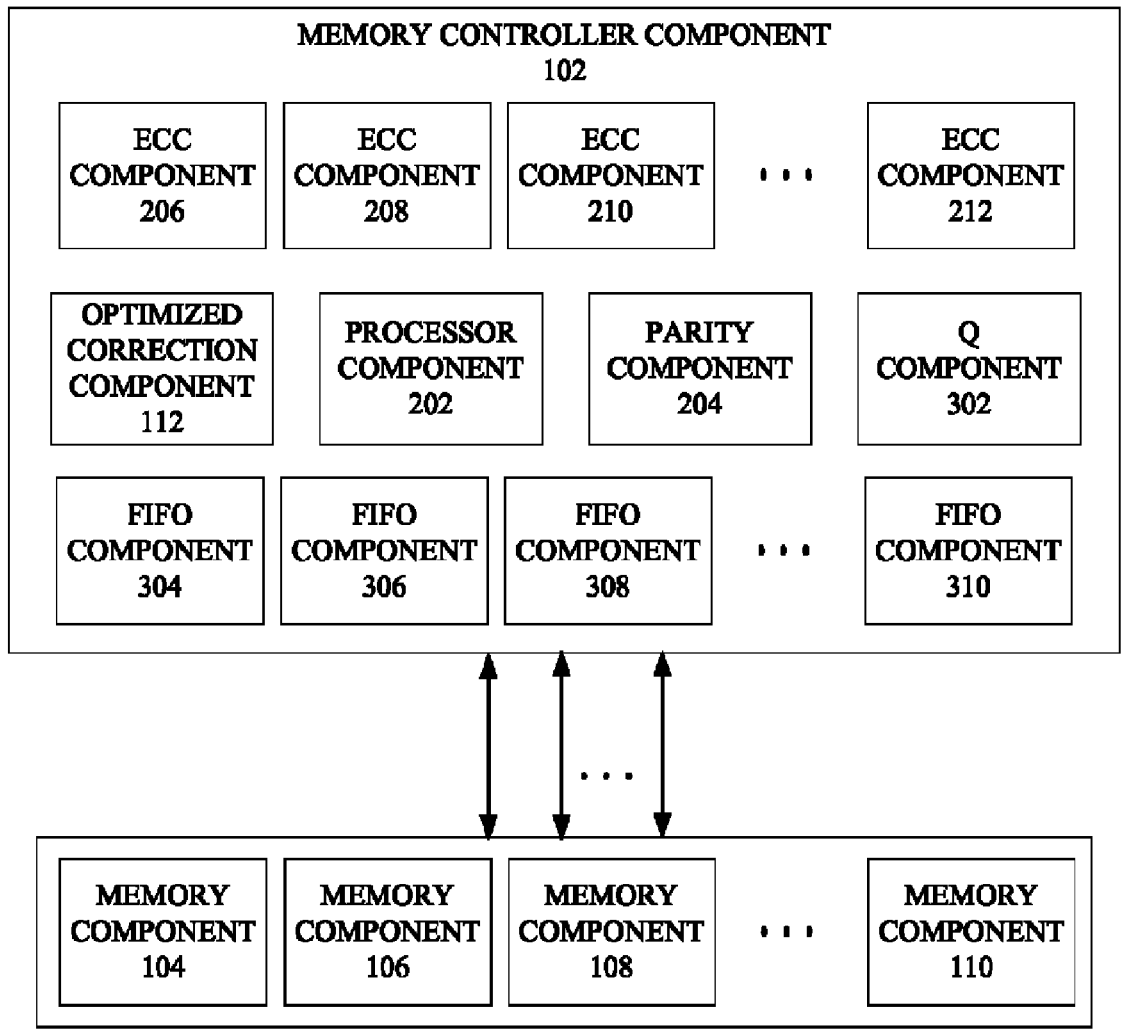
FIG. 3 depicts an example diagram of a system that can facilitate correcting data errors that can be associated with two memory components in accordance with the disclosed subject matter.

Turning to FIG. 3, illustrated is a block diagram of a system 300 that can facilitate correcting data errors that can be associated with the data contained in two memory components in accordance with the disclosed subject matter. The system 300 can include a memory controller component 102 that can be a control engine that can facilitate sending and receiving data and commands to a the memory components 104 through 110. System 300 can also include one or more ECC components 206 through 212, wherein the one or more ECC components 206 through 212 can facilitate correcting data errors that can be associated with the data contained in the data blocks that can be read from one or more of the memory components 104 through 110. The system 300 can also include an optimized correction component 112 and a processor component 202 that can, either in conjunction or independently, correct one or more data errors via the redundancy information that can be, for example, generated by the parity component 204 and stored into one of the memory components 104 through 110 associated with the memory controller component 102. It is to be appreciated that, that the memory controller component 102, memory components 104 through 110, and optimized correction component 112 can each include their respective functionality as more fully described herein, for example, with regard to system 100 and system 200. It is to be further appreciated that the processor component 202, parity component 204, and ECC components 206 through 212 can each include their respective functionality as more fully described herein, for example, with regard to system 200.

In one embodiment of the disclosed subject matter, additional redundancy can be built into one or more data stripes that can be stored in the memory components 104 through 110, and it is to be appreciated that the disclosed subject matter contemplates that the memory controller component 102 can accommodate up to virtually any number of memory components, but for brevity, system 300 only depicts four memory components. In such an embodiment, the memory controller component 102 can be associated with Y+2 memory components, wherein Y can represent the number of memory components required for a system (not shown) or host (not shown) that can be associated with the memory controller component 102. The additional memory components (e.g., the "+2" memory components) can be used to store redundancy data blocks that can be associated with each data stripe that can be distributed across all of the memory components 104 through 110, for example. One of the redundancy blocks can, for example, be a parity block that the optimized correction component 112 can generate via the parity component 204 as described herein in regards to system 200.

In accordance with one aspect of the disclosed subject matter, the optimized correction component 112 can facilitate generating another redundancy block via the Q component 302. The Q component 302 can implement an alternative redundancy scheme to produce the additional redundancy block (hereinafter also referred to as a "Q block"). For example, the Q component 302 can implement a Reed-Solomon coding scheme to generate the Q block. It is to be appreciated that the Reed-Solomon redundancy generation and error correction can be used in arithmetic implementing Galois Field manipulation and that the Reed-Solomon code generation is known to those skilled in the art.

It is to be appreciated that as the number of the memory components associated with a memory controller component 102 grows, the ability to tolerate multiple errors or memory component failures can become more important because the likelihood of more than one of the memory components producing errors or becoming defective can to up (e.g., there are more memory components available to produce errors or become defective). The introduction of Q block can facilitate providing the ability to correct data errors from two simultaneous memory components (e.g., two of the memory components 104 through 110). For example, if two of the data blocks associated with two of the memory components 104 through 110 contain errors, the optimized correction component 112 can use the information contained within the parity block and the information contained in the Q block (e.g., a block generated using the Reed-Solomon coding scheme) to reconstruct the original data contained within the two data blocks that contain the errors.

In accordance with one aspect of the disclosed subject matter, the optimized correction component 112 can generate a parity block (e.g., via the parity component 204) and the Q block from the data that is to be written to the memory components 104 through 110. The optimized correction component 112 can break the data into Y−2 data blocks (e.g., wherein Y can represent the number of memory components associated with the memory controller component 102) and assemble the data blocks, the parity block, and the Q block into a data stripe. In accordance with one aspect of the disclosed subject matter, when the data stripe is read, the optimized correction component 112 can correct up to all of the data associated with up to two of the data blocks associated with the data stripe.

It is to be appreciated that as memory components (e.g., memory components 104 through 110) become more compact and able to store more information that systems (e.g., system 300) can employ the memory components 104 through 110 as main or primary storage devices for the system. It is to be further appreciated that the reliability of the data contained in the primary storage devices, for example, can be more critical to some systems than other systems. In a situation wherein the ability to recover from a storage device (e.g., one or more of the memory components 104 through 110) failure can be critical for a system, the use of the additional redundancy block (e.g., the Q block that can be generated by the Q component 302) can become more important. The disclosed subject matter contemplates that a system (e.g., system 300) can encounter a situation wherein one or two of the memory components 104 through 110 (or more) associated with the memory controller component 102 can become defective, and the use of the two redundancy blocks (e.g., the parity block and the Q block) can facilitate the ability to recover from up to two of the memory components 104 through 110 associated with a memory components 104 through 110 failing. Further, the disclosed subject matter contemplates that the optimized correction component 112 and/or the processor component 202 can reconstruct the data associated with one or two of the memory components 104 through 110 that become defective by using the parity block and the Q block, for example. The reconstructed data can, for example, be transmitted to another memory component that can be added to the system 300 to replace the defective memory component. Further, the memory controller component 102 and associated components (e.g., the optimized correction component 112, ECC components 206 through 212, processor component 202 etc.) can continue to read data from the memory components 104 through 110 while the data can be reconstructed and stored into the memory component that can be added to the system 300 to replace the defective memory component, for example.

In accordance with one aspect of the disclosed subject matter, the system 300 can also include a first-in-first-out (FIFO) component 304, FIFO component 306, FIFO component 308, and FIFO component 310 (hereinafter also referred to "FIFO components 304 through 310"). It is to be appreciated that, for brevity, only four FIFO components are depicted in system 300; however, the disclosed subject matter contemplates that virtually any number of FIFO components can be utilized within the system 300 to facilitate expediently reading and/or correcting error associated with the data (e.g., data stripes) from the memory components. It is to be further appreciated that that the FIFO components 304 through 310 can be employed in systems that incorporate using a Q component 302 and a parity component 204 to generate a parity block and a Q block (e.g., as depicted in system 300) or in systems that incorporates using only a parity component 204 to generate only a parity block (e.g., as depicted in system 200 wherein the FIFO components 304 through 310 are not explicitly depicted).

In accordance with one aspect of the disclosed subject matter, the optimized correction component 112 can utilize one or more of the FIFO components 304 through 310 to store the data blocks associated with a data stripe. When creating redundancy blocks (e.g., a parity block and/or a Q block) or in the event of a data error encountered when reading a data stripe, the FIFO components 304 through 310 can be used to facilitate performing the redundancy operations (e.g., XOR and/or Reed-Solomon functions) on the data blocks associated with the data stripe. For example, the data blocks associated with a particular data stripe can be stored (e.g., temporarily) into the FIFO components 304 through 310 to facilitate the computation of one or two redundancy blocks that can be associated with a data stripe.

In accordance with one aspect of the disclosed subject matter, the optimized correction component 112 can, for example, facilitate transferring a first data block associated with the data stripe into a first FIFO component (e.g., during the generation of a parity block associated with the data stripe). The optimized correction component 112 can, for example, facilitate transferring the contents of the first FIFO component (e.g., the first data block) to the parity component 204 while the optimized correction component 112 directs a second data block to the parity component 204. The parity component 204 can perform a bit-wise XOR operation on the first data block and the second data block of the data stripe and can store the result in a second FIFO component, for example. The optimized correction component 112, FIFO components 304 through 310, and parity component 204 can continue performing bit-wise XOR functions on subsequent data blocks until all of the data blocks associated with a particular data stripe are utilized to create the parity block, for example. It is to be appreciated that the FIFO components 304 through 310 can be utilized in the same manner to store data blocks and intermediate results with respect to the generation of an additional redundancy block (e.g., that can be generated via the Q component 302). For example, intermediate results obtained from the Q component can be stored in one or more of the FIFO components 304 through 310 during the computation of a Q block associated with a particular data stripe.

In accordance with one embodiment of the disclosed subject matter, the ECC control component, optimized correction component 112, processor component 202 or a combination thereof can, for example, make an analysis as to whether it can be more efficient for one or more errors associated with the data in a data stripe to be corrected by utilizing the information contained in the redundancy blocks (e.g., via the optimized correction component 112) or to have one or more of the ECC components 206 through 212 perform the error corrections. The determination can be based in part on a predetermined criteria wherein the predetermined criteria can be, for example, based in part on the number of pieces of data (e.g., a piece of data can be the data contained in a data block) that contain errors, the number of errors each of the pieces of data contain, or a combination thereof. If, for example, the number of data blocks associated with a particular data stripe that contain data with errors is at or greater than a predetermined threshold number (e.g., 3), one or more of the ECC components 206 through 212 can be instructed to perform the error corrections. In another example, if one of the memory components associated with memory controller component 102 fails (e.g., resulting in losing the data associated with one of the data blocks), the optimized correction component 112 in coordination with the parity component 204 and/or the Q component 302 can be instructed to correct or rebuild the data block.

Figure 4:
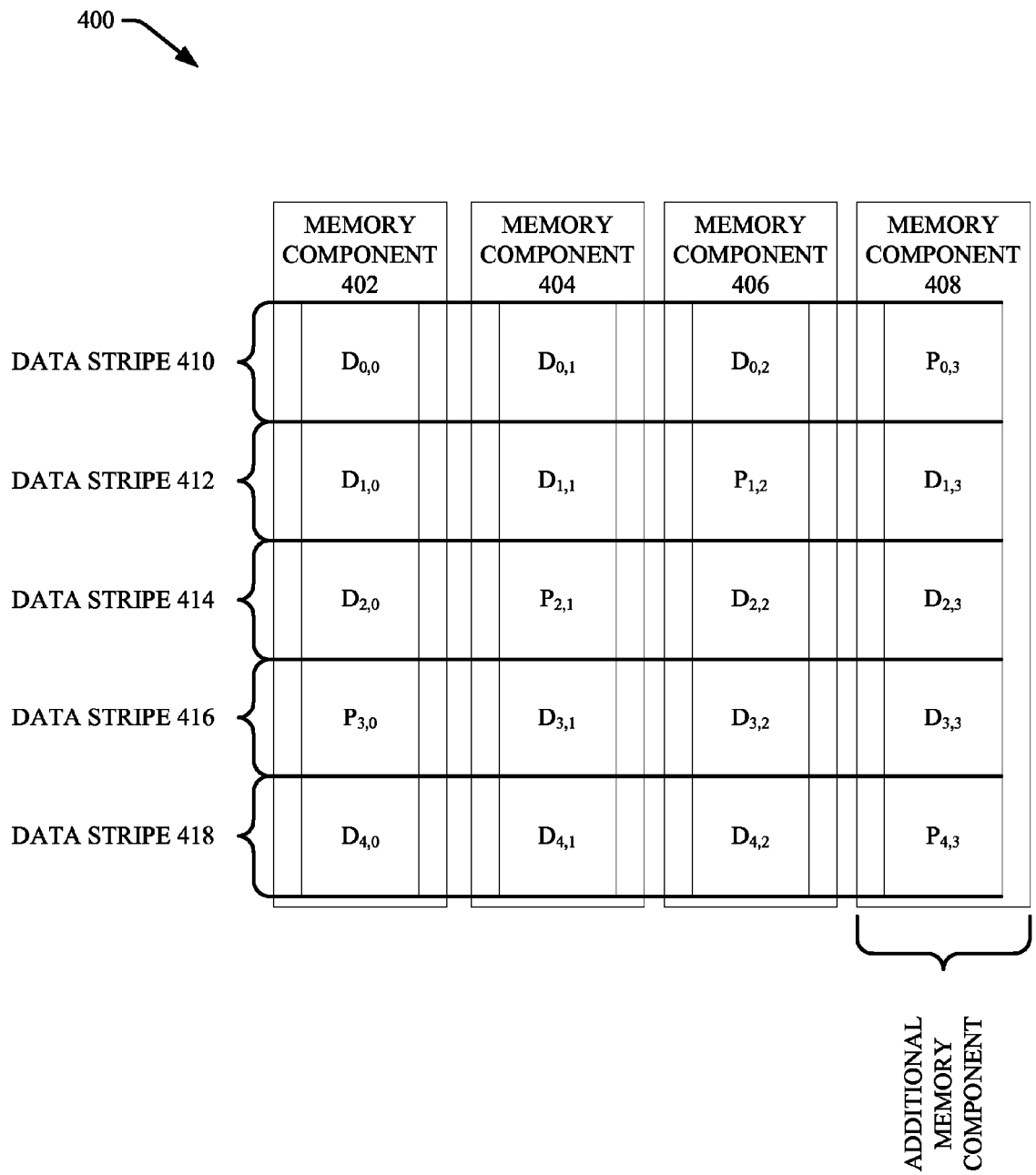
FIG. 4 illustrates a block diagram of a system that can facilitate storing one redundancy block that can be associated with a data stripe in accordance with an aspect of the subject matter disclosed herein.

Referring to FIG. 4 illustrates a block diagram of a system 400 that can facilitate storing one redundancy block that can be associated with a data stripe in accordance with an embodiment of the disclosed subject matter. In accordance with one aspect, the system 400 can include memory component 402, memory component 404, memory component 406, and memory component 408 (hereinafter also referred to as memory components 402 through 408). The memory components 404 through 408 can be used to store data, and can comprise nonvolatile memory (e.g., flash memory) and/or volatile memory, for example. It is to be appreciated that memory components 402 through 408 can include the same or substantially similar functionality as, for example, the memory components 104 through 110 as more fully described herein, for example, with regard to system 100, system 200, and/or system 300. It is also to be appreciated that, for brevity, system 400 only includes four memory components (e.g., memory components 402 through 408); however, the disclosed subject matter contemplates that the system 400 can include as few as three memory components or up to virtually any number of memory components, for example.

In accordance with one aspect of the disclosed subject matter, the memory components 402 through 408 can be the same or substantially similar to, and/or can comprise the same or similar functionality as, respective memory components (e.g., the memory components 104 through 110 as depicted in system 200). The memory component 408 can be, for example, an additional memory component added to a system (not shown) to facilitate accommodating a parity block that can be generated by an optimized correction component (e.g., optimized correction component 112 of FIG. 1) in conjunction with a parity component (e.g., parity component 204 of FIG. 2). The memory components 402 through 408 can be represented as containing data stripes, as illustrated in FIG. 4 via the data stripe 410, data stripe 412, data stripe 414, data stripe 416, and data stripe 418 (hereinafter also referred to as "data stripes 410 through 418"). The data stripe 410 can, for example, include the data block $D_{0,0}$, data block $D_{0,1}$, data block $D_{0,2}$, and the parity block $P_{0,3}$. The data stripe 412 can, for example, include data block $D_{1,0}$, data block $D_{1,1}$, the parity block $P_{1,2}$, and the data block $D_{1,3}$. As illustrated in the data stripe 410 and data stripe 412 (and in the other data strips (e.g., data stripe 414, data stripe 416, data stripe 418)) the parity blocks associated with adjacent data stripes can be stored in byte-wise linear combinations of data elements in a rotating parity stripe. For example, the party blocks (e.g., $P_{0,3}$, $P_{1,2}$, $P_{2,1}$, $P_{30}$, $P_{4,3}$) can be evenly distributed across all of the memory components 402 through 408 associated with system 400. By rotating the parity block in relation to successive data stripes among the memory components 402 through 408, the system 400 can facilitate preventing the loss of all of the redundancy information associated with the system 400. Such a situation can occur, for example, if all of the parity blocks are stored in one memory component and that memory component becomes defective.

It is to be appreciated that system 400 can also include a memory component to contain an additional redundancy block (not shown) (e.g., a Q block that can be generated via a Q component 302 as described in system 300). It is to be appreciated that the Q block can be stored in the memory components 402 through 408 in a similar fashion as the parity blocks (e.g., $P_{0,3}$, $P_{1,2}$, $P_{2,1}$, $P_{30}$, $P_{4,3}$). For example, the Q blocks can be situated in a rotating pattern going from one data stripe to an adjacent data stripe in reference to consecutive memory components. For example, there can be a corresponding $Q_{0,4}$, $Q_{1,3}$, $Q_{2,2}$, $Q_{31}$, $Q_{4,3}$ and $Q_{4,1}$ Q blocks, wherein the Q blocks can be situated in a rotating pattern as well (e.g., where there is an additional memory component (not shown) that can be associated with a memory controller component that can accommodate the additional Q or redundancy block).

Figure 5:
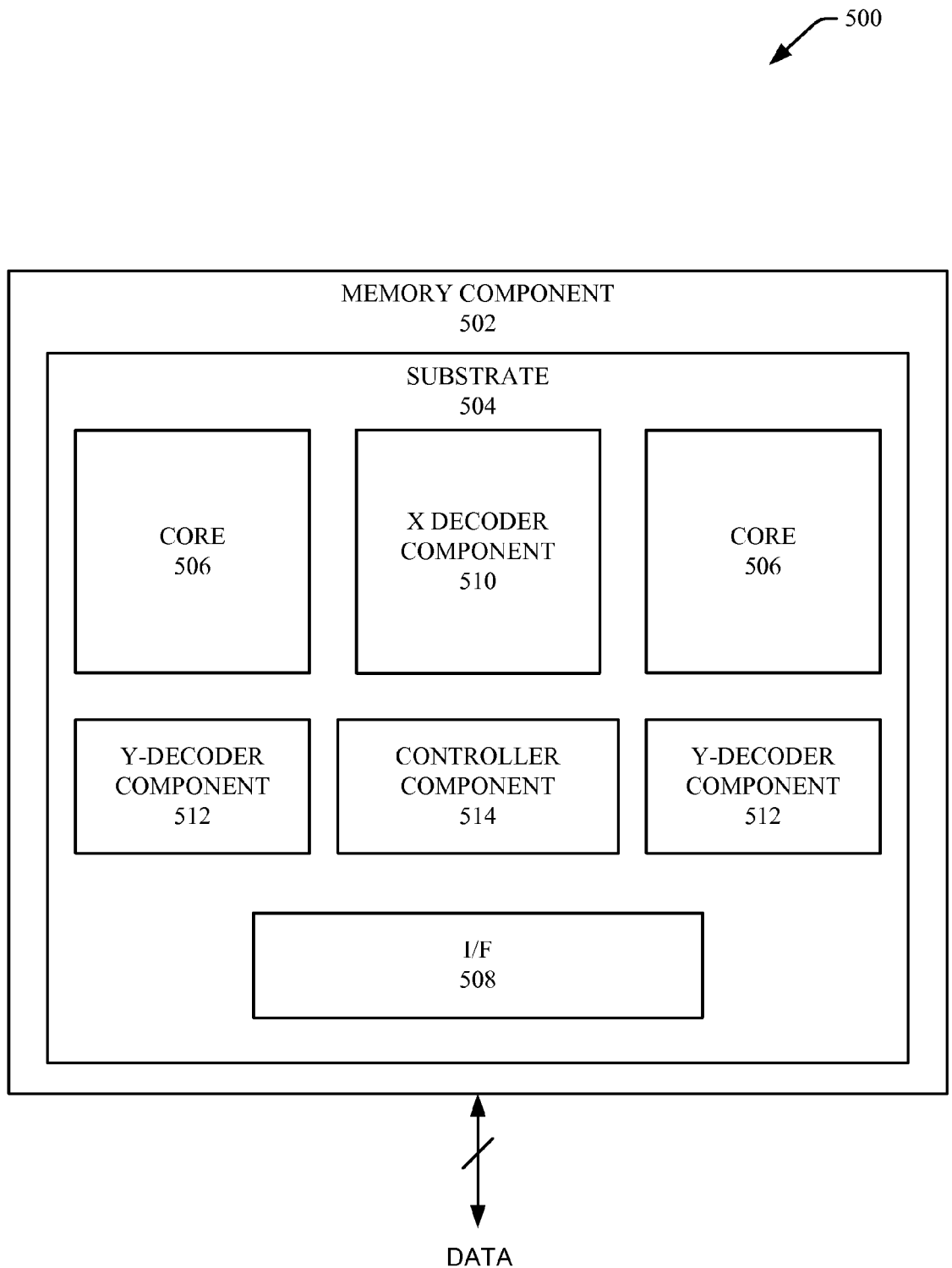
FIG. 5 illustrates a block diagram of a system that depicts an example memory component that can be used in a system in accordance with an aspect of the subject matter disclosed herein.

Referring to FIG. 5, illustrated is a block diagram of a system 500 that can facilitate storage of data in accordance with the disclosed subject matter. In accordance with an aspect, the system 500 can be or can include a memory component 502, which can be a flash memory (e.g., single-bit flash memory, multi-bit flash memory), that can have the same or substantially the same functionality as the memory components 104 through 110 as more fully described herein, for example, with regard to system 100, system 200, and/or system 300, and/or the memory components 402 through 408 as more fully described herein, for example, with regard to system 400. The memory component 502 can be created on a semiconductor substrate 504 in which one or more core regions 506, which can be higher-density core regions, and one or more peripheral regions, which can be lower-density regions, can be formed. The high-density core regions 506 can include one or more M by N arrays of individually addressable, substantially identical multi-bit memory cells (not shown). The memory cells in memory component 502 can retain stored data even while disconnected from a power source.

The lower-density peripheral regions can typically include an interface component 508 (hereinafter also referred to as "I/F 508") and programming circuitry for selectively addressing the individual memory cells. The programming circuitry can be represented in part by and can include one or more x-decoders 510 and one or more y-decoders 512 that can cooperate with the I/F 508 for selectively connecting a source, gate, and/or drain of selected addressed memory cells to predetermined voltages or impedances to effect designated operations (e.g., programming, reading, erasing) on the respective memory cells, and deriving necessary voltages to effect such operations. Further, the I/F 508 can include and/or provide various adapters, connectors, channels, communication paths, etc. to integrate the system 500 into virtually any operating and/or database system(s) and/or with another system(s). In addition, I/F 508 can provide various adapters, connectors, channels, communication paths, etc., that can provide for interaction and/or communication with other components, data, and the like, associated with the system 500.

System 500 can also include a controller component 514 that can facilitate control of the flow of data to and from the memory component 502. In one aspect, the controller component 514, by itself or in conjunction with a processor (e.g., processor component 202 of FIG. 2), can facilitate execution of operations (e.g., read, write, erase) associated with memory locations in the core(s) 506. In another aspect, the controller component 514 can facilitate verifying and/or maintaining the desired charge level(s) associated with data stored in the memory locations in the core(s) 506. In accordance with one embodiment of the disclosed subject matter, one or more of the memory components 104 through 110 of FIG. 1 and/or one or more of the memory components 402 through 408 of FIG. 4 can be or can include the memory component 502.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
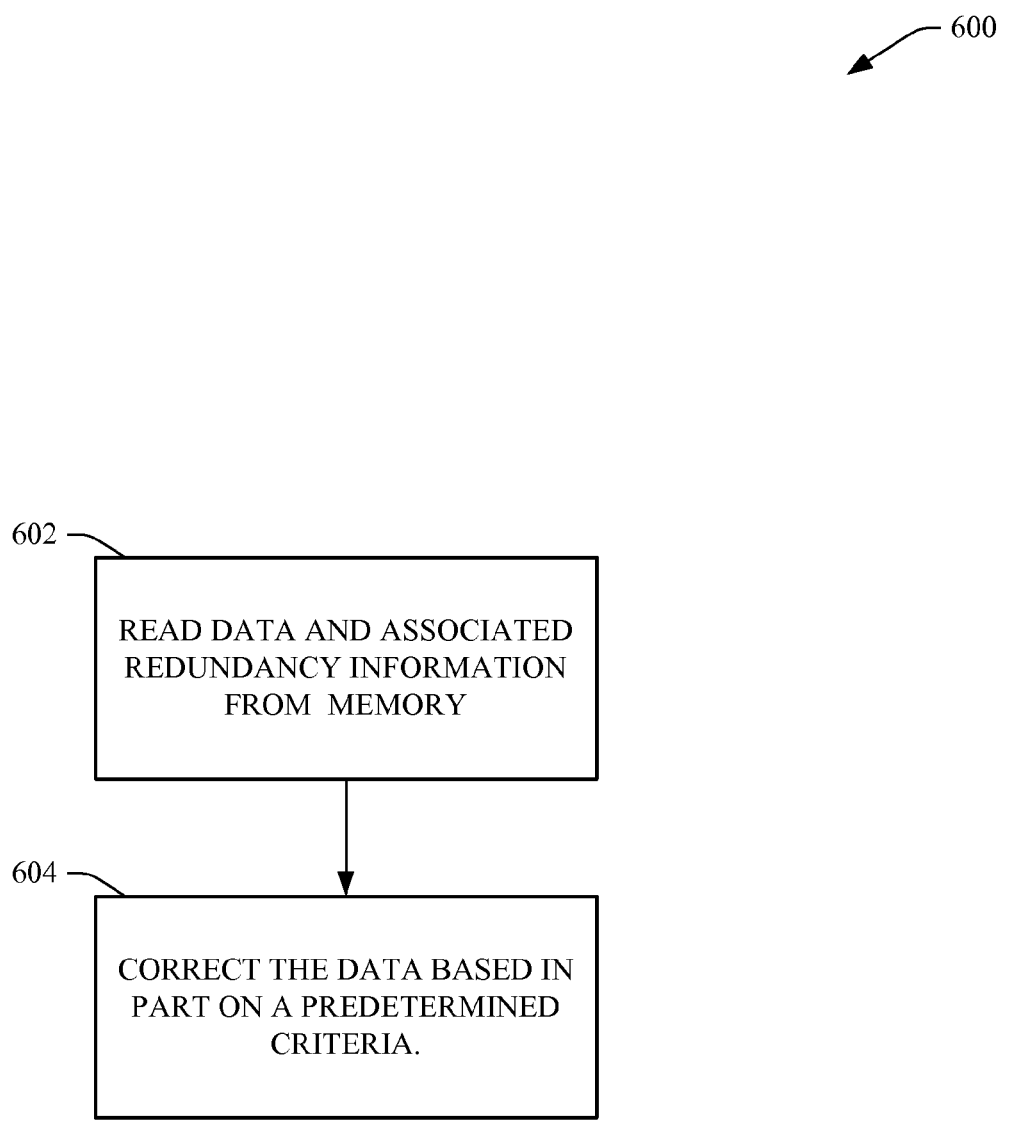
FIG. 6 depicts a methodology that can facilitate correcting data associated with memory components in accordance with an aspect of the disclosed subject matter.

Referring to FIG. 6, a methodology 600 that can facilitate correcting data associated with memory components in accordance with the disclosed subject matter is illustrated. At 602, data and the associated redundancy information can be read from a memory. For example, a memory controller component (e.g., memory controller component 102 of FIG. 2) can facilitate reading a data stripe (e.g., one of the data stripes 410 through 418 of FIG. 4) which can contain two or more data blocks along with one or two redundancy blocks (e.g., a parity block as described in system 200, system 300, and system 400 and/or a Q block as described in system 300 and system 400). For instance, the information read from the memory can be transferred to one or more FIFO components (e.g., FIFO components 304 through 310 of FIG. 3), where the data can reside until retrieved for error detection and/or correction.

At 604, errors that can be contained in the data of one or more of the data blocks associated with the data stripe can be corrected based in part on a predetermined criteria. In accordance with one aspect of the disclosed subject matter, one or more ECC components (e.g., ECC components 206 through 212 of FIG. 2 and FIG. 3) can facilitate determining whether an optimized correction component (e.g., optimized correction component 112 of FIG. 1) will correct a data block that can be read from three or more memory components (e.g., memory components 104 through 110 of FIG. 1, memory components 402 through 408 of FIG. 4). In accordance with another aspect of the disclosed subject matter, the optimized correction component can make the determination of whether one or more of the ECC components or the optimized correction component will correct the errors that can be associated with the data of a particular data block.

In one aspect, the ECC control component can, for example, make an analysis as to whether it can be more efficient for the optimized correction component to perform data corrections that can be associated with a data block or for one or more of the ECC components to perform the data corrections based on a predetermined criteria. It is to be appreciated that, depending on the ECC function an ECC component uses to detect and correct errors, it can take from tens of clock cycles to tens of thousands of clock cycles to correct the data that has errors. For instance, there can be a correlation between the number of errors within data of a given data block and the number of clock cycles required for an ECC component to correct the errors (e.g., as the number of errors in the data of a given block go up, the number of clock cycles to correct all of the errors can go up).

In another aspect, the predetermined criteria can be or can relate to whether or not a data block associated with a data stripe has a predetermined threshold number of errors (or more). In accordance with one aspect of the disclosed subject matter, if a data block contains a number of errors that is at or more than the predetermined threshold number of errors, a processor (processor component 202 of FIG. 2) can, for example, instruct the optimized correction component to facilitate correcting the data errors via the use of a parity block (e.g., parity component 204 as discussed in system 200) and/or the Q block (e.g., Q component 302 as discussed in system 300). If, for example, the data block contains a number of errors that is less than the predetermined threshold number of errors, one or more of the ECC components can facilitate correcting the errors contained within the data associated with the data block. In another aspect, the predetermined criteria can relate to whether one of the memory components that contains the data associated with a data block fails. In such a situation, the optimized correction component can be instructed to facilitate correcting data errors associated with data coming from the failed memory component, for example. It is to be appreciated that by choosing an optimal way of correcting errors that can be associated with a data block (e.g., via the optimized correction component of FIG. 1 or via one or more of the ECC components 206 through 212 of FIG. 2), the overall time to correct the errors associated with the data block can be reduced, thus resulting in an overall system efficiency improvement regarding read operations. At this point, methodology 600 can end.

Figure 7:
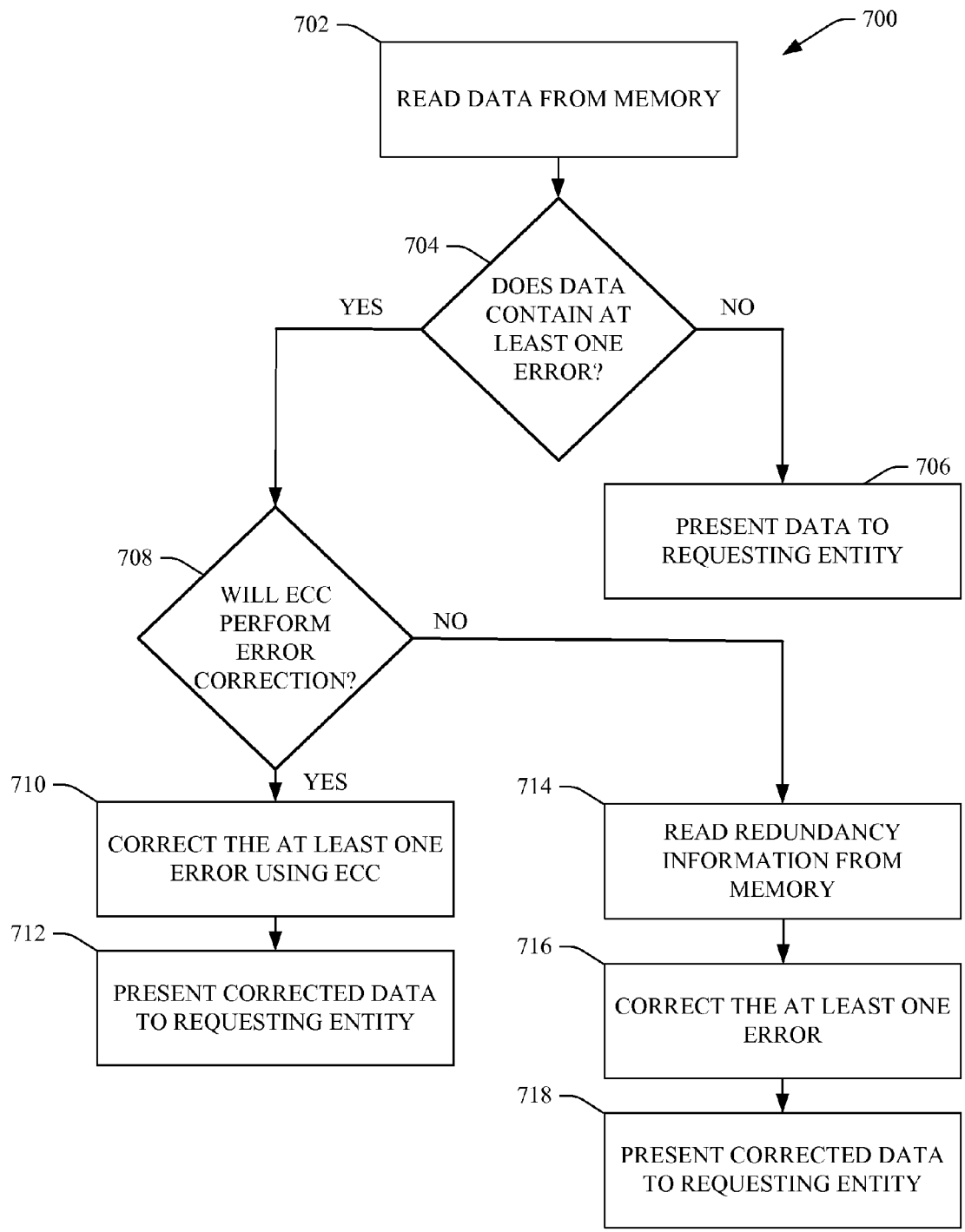
FIG. 7 illustrates a methodology that can facilitate determining if an error correction code (ECC) component will correct errors associated with reading a memory array in accordance with an aspect of the disclosed subject matter.

Turning to FIG. 7, a methodology 700 that can facilitate error correction of data associated with a memory in accordance with an aspect of the disclosed subject matter is depicted. At 702, data can be read from memory. In accordance with one aspect of the disclosed subject matter, a processor component (e.g., processor component 202) can generate a read command(s) to facilitate reading information from one or more memory components (memory components 104 through 110 of Figure, memory components 402 through 408 of FIG. 4). In one aspect, the data can be read and transferred into one or more FIFO components (FIFO components 304 through 310 of FIG. 3), for example.

At 704, a determination can be made as to whether or not the data that has been read contains at least one error. In accordance with one aspect of the disclosed subject matter, an ECC component (e.g., one of the ECC components 206 through 212 of FIG. 2) that can be associated with a memory controller component (e.g., memory controller component 102 of FIG. 1) can have circuitry built into the ECC component to facilitate determining if one or more data blocks associated with one or more of the memory components contain data that has at least one error. The ECC component can, for example, facilitate notifying a processor (e.g., processor component 202 of FIG. 2) that can be associated with the memory component whether or not the data contains at least one error. In another aspect, an optimized correction component can facilitate determining if one or more data blocks associated with one or more of the memory components contain data that has one or more errors when read from a memory location (e.g., memory cell) in the respective memory component (e.g., by using the parity block to determine if one of the data blocks contains data that has an error). If it is determined that the data does not contain at least one error, then, at 706, the processor can, for example, furnish the error-free data to the entity that requested the data via a bus.

Returning back to reference numeral 704, if it is determined that the data (e.g., a data stripe) read from one or more of the memory components does contain an error, at 708, a determination can be made as to whether one or more of the ECC components that can be associated with the memory component is to perform an the error correction. The determination as to whether the ECC component is to perform the error correction can be, for example, based in part on a predetermined error correction criteria. The predetermined error correction criteria can be or can relate to whether or not a data associated with a data stripe that is read from a data blocks in the memory components has more than a predetermined threshold number of errors, for example. If, for example, the data contains less than the predetermined threshold number of errors, at 710, the one or more ECC components can facilitate correcting the data via the error correction functions that can be associated with the one or more ECC components. After the one or more ECC components correct the data, at 712, the processor component and/or one or more of the ECC components can present the corrected data to the entity/device that requested the data via a bus, for example.

Returning back to reference numeral 708, if it is determined that one or more of the ECC components is not selected to perform the error correction associated with the data, at 714, an optimized correction component (e.g., optimized correction component 112 of FIG. 1) can be selected and can facilitate retrieving redundancy information (e.g., a parity block as described in system 200 and/or a Q block as described in system 300) from one or more of the memory components (e.g., memory components 104 through 110 of FIG. 1). In accordance with one aspect of the disclosed subject matter, the optimized correction component can facilitate storing the parity block and/or Q block associated with the data stripe from the memory component into, for example, one or more FIFO components (e.g., FIFO components 304 through 310 of FIG. 3).

At 716, the optimized correction component can, for example, facilitate transferring the data blocks, the parity block, the Q block or a combination thereof from one or more of the FIFO components to a parity block (e.g., parity component 204 of FIG. 2) and/or a Q component (e.g., Q component 302 of FIG. 3) to facilitate correcting the at least one error.

At 718, the optimized correction component and/or the processor (e.g., processor component 202 of FIG. 2) can facilitate transferring the data, as corrected, to the entity that requested the data. At this point, methodology 700 can end.

Figure 8A:
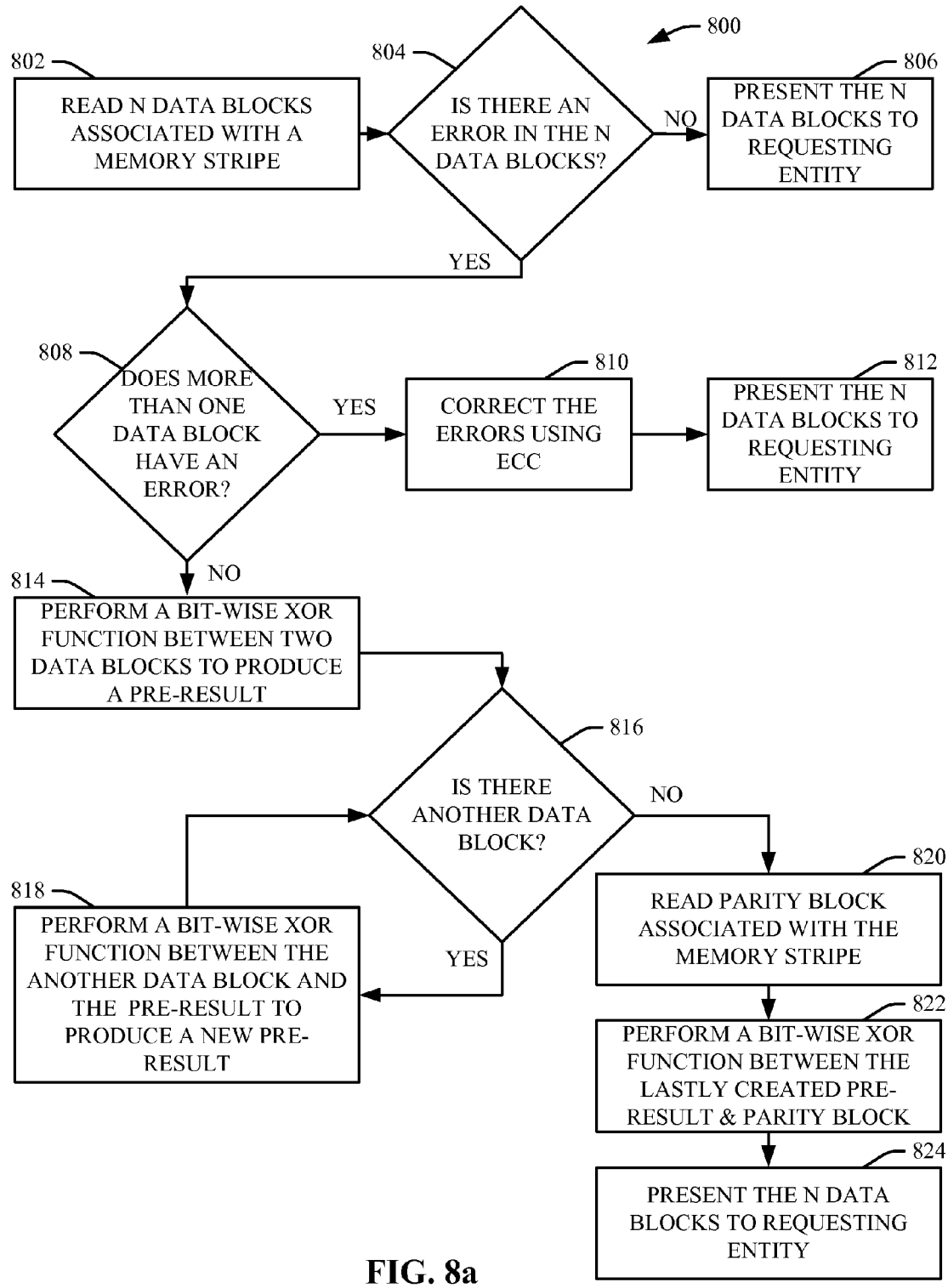
FIG. 8a illustrates a methodology that can facilitate correcting data errors with one additional memory component to store redundancy information in accordance with an embodiment of the disclosed subject matter.

Referring to FIG. 8a, a methodology 800 that can employ an additional memory component(s) to facilitate correcting data errors associated with a memory in accordance with an embodiment of the disclosed subject matter is illustrated. At 802, data can be read from memory. In accordance with one aspect of the disclosed subject matter, a processor component (e.g., processor component 202) can facilitate reading Y data blocks that can be associated with a data stripe (e.g., one of the data stripes 410 through 418 of FIG. 4) from memory components (memory components 104 through 110 of FIG. 1, memory components 402 through 408 of FIG. 4) that can be associated with a memory controller component (memory controller component 102 of FIG. 1). In one aspect, the Y data blocks can be read into one or more FIFO components (FIFO components 304 through 310 of FIG. 3), for example.

At 804, a determination can be made as to whether or not one or more of the Y data blocks contain data that has an error(s). In accordance with one aspect of the disclosed subject matter, an ECC component (e.g., one of the ECC components 206 through 212 of FIG. 2) can facilitate determining if one or more of the Y data blocks contain data that has error(s). If it is determined that that none of the Y data blocks contain data that has errors then, at 806, the data in the Y data blocks can be presented to the requesting entity or device.

Returning back to reference numeral 804, if it is determined that the Y data blocks contain data that has error(s), then, at 808, a determination can be made as to whether or not more than one of the Y data blocks contains data that has an error(s). In accordance with one aspect of the disclosed subject matter, one or more of the ECC components, the processor, an optimized correction component (e.g., optimized correction component 112 of FIG. 1) or a combination thereof can determine if more than one of the Y data blocks that contain data that has errors (e.g., by monitoring error indicator lines that can be associated with one or more of the ECC components).

If it is determined that more than one of the Y data blocks contains data that has error(s) then, at 810, one or more of the ECC components can perform the error correction. For example, the data blocks that contain data that has error(s) (e.g., of the Y data blocks) can be transmitted (e.g., from one or more of the FIFO components and/or one or more of the memory components) to the one or more ECC components wherein the one or more ECC components can correct the error(s). After the one or more ECC components correct the error(s), at 812, the Y data blocks (e.g., that have been corrected back to their original "good" state) can be presented to the requesting entity/device, for example.

Returning back to reference numeral 808, if it was determined that not more than one data block has data that has an error, then, at 814, a bit-wise XOR function can be performed between that data in two of the Y data blocks that do not contain errors to produce a pre-result. In accordance with one aspect of the disclosed subject matter, one Y data block that does not contain data that has errors can be stored in a FIFO component (e.g., one of the FIFO components 304 through 310 of FIG. 3), for example. An optimized correction component (e.g., optimized correction component 112 of FIG. 1) can facilitate transferring the data block (e.g., a bit or byte at a time) from the FIFO component to a parity component (e.g., parity component 204 of FIG. 2) while simultaneously facilitate transferring another data block that does not contain errors from another FIFO component or a memory component to the parity component, for example. The parity component can perform the XOR function on the two sets of data blocks that do not contain errors to produce a pre-result, for example.

At 816, a determination can be made as to whether there is another data block associated with the data stripe. In accordance with one aspect of the disclosed subject matter, the optimized correction component and/or the processor can keep track of the number of data blocks associated with a particular data stripe. If it is determined that there is another data block associated with the data stripe, then, at 818, a bit-wise XOR can be performed between the another data block and the pre-result to produce a new pre-result. In accordance with one aspect of the disclosed subject matter, the pre-result and/or any subsequent new pre-results can be stored, for example, in the optimal correction component, the parity component or a FIFO component, for example.

The optimized correction component in conjunction with the parity component, for example, can continue to perform XOR functions on additional data blocks that can be associated with the data stripe, as depicted in the loop that is created between reference numeral 816 and reference numeral 818. Once a bit-wise XOR function has been preformed on all of the data blocks associated with a data stripe that did not have data that contains errors, at 820, the parity block associated with the data stripe can be read. In accordance with one aspect of the disclosed subject matter, the optimized correction component can, for example, facilitate reading the parity block and furnishing the parity block to the parity component.

At 822, a bit-wise XOR function can be performed between the lastly created pre-result and the parity block. Then, at 824, the Y data blocks can be presented to the requesting entity or device. At this point, methodology 800 can end.

Figure 8B:
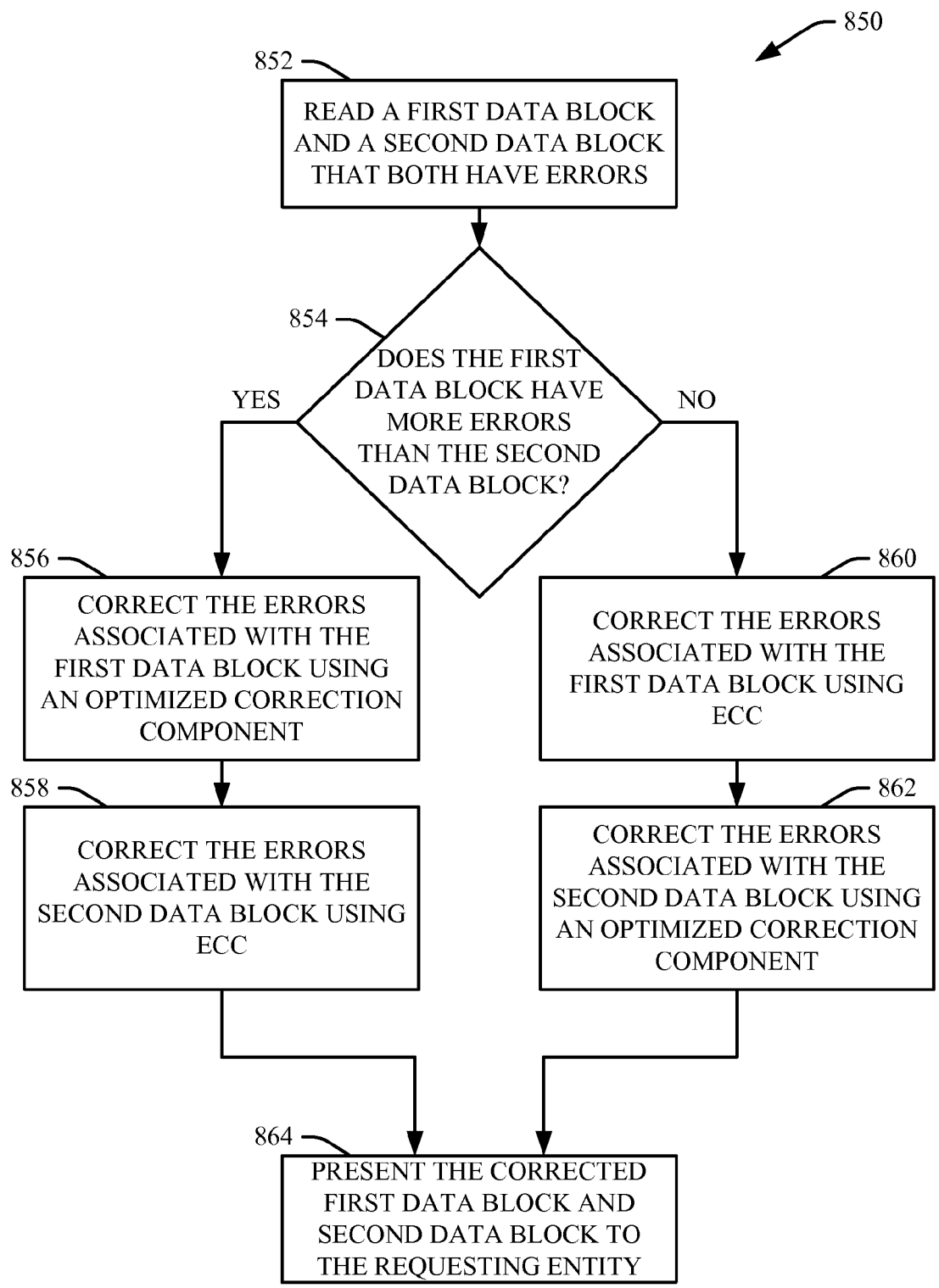
FIG. 8b illustrates a methodology that can facilitate correcting errors associated with two data blocks associated with errors in accordance with an embodiment of the disclosed subject matter.

Referring to FIG. 8b, a methodology 850 that can facilitate correcting errors associated with two data blocks that contain data associated with errors in accordance with an embodiment of the disclosed subject matter is illustrated. At 852, a first data block that contains data that has an error(s) and a second data block that contains data that has an error(s) can be read. In accordance with one aspect of the disclosed subject matter, a processor component (e.g., processor component 202) can facilitate reading the first data block that contains data that has the error(s) from one or more memory components (memory components 104 through 110 of FIG. 1, memory components 402 through 408 of FIG. 4) that can be associated with a memory controller component (memory controller component 102 of FIG. 1). In one aspect, the first data block that contains data that has the error(s) can be read into one or more FIFO components (FIFO components 304 through 310 of FIG. 3), for example. Further, the second data block that contains data that has an error(s) can be read in a similar fashion, for example, by the processor component and placed into another FIFO component.

At 854, a determination can be made as to whether or not the number of errors associated with the first data block is higher than the number of errors associated with the second data block. In accordance with one aspect of the disclosed subject matter, an ECC component (e.g., one of the ECC components 206 through 212 of FIG. 2) can facilitate determining the number of errors that can be associated with each of the data blocks (e.g., the first data block and the second data block), and the processor component, for example, can make the computation to determine if the first data block is associated with a higher number of errors than that of the second data block. In accordance with another aspect of the disclosed subject matter, one or more of the ECC components, the processor component, an optimized correction component (e.g., optimized correction component 112 of FIG. 1), or a comparison component (not shown), or a combination thereof, can determine if the first data block is associated with more errors than the number of errors associated with the second data block. If it is determined that that the first data block is associated with more errors than the number of errors associated with the second data block, at 856, the errors associated with the first data block can be corrected using an optimized correction component (e.g., optimized correction component 112 of FIG. 1). For example, the optimized correction component can use one or two redundancy blocks (e.g., a parity block and/or a Q block) to facilitate recovering the errors associated with the first data block.

At 858, the errors associated with the second data block can be corrected using one or more ECC components (e.g., one or more of the ECC components 206 through 212 of FIG. 2). For example, the second data block that contains data that has error(s) can be transmitted (e.g., from one or more of the FIFO components and/or one or more of the memory components) to the one or more of the ECC components wherein the one or more ECC components can correct the error(s) associated with the second data block.

Returning back to reference numeral 854, if it is determined that the first data block does not contain more errors associated with the data contained therein than the number of errors associated with the data contained in the second data block, at 860, the one or more ECC component(s) can correct the errors associated with the first data block. It is to be appreciated that that the one or more ECC component(s) can correct the errors associated with the first data block if the number errors associated with the first data block equals the number of errors associated with the second data block.

At 862, the errors associated with the second data block can be corrected using an optimized correction component (e.g., optimized correction component 112 of FIG. 1). For example, the optimized correction component can use one or two redundancy blocks (e.g., a parity block and/or a Q block) to facilitate recovering (e.g., correcting) the errors associated with the first data block.

It is to be appreciated that the error corrections performed by one or more of the ECC components and the error corrections performed by the optimized correction component can be performed sequentially, or alternatively the error corrections can be performed by the two components (e.g., the one or more ECC components and the optimized correction component) at the same or substantially same time (e.g., in parallel). For example, the act(s) performed at reference numeral 856 (e.g., wherein the optimized correction component corrects the errors associated with the first data block) can be performed at the same or substantially the same time as the act(s) performed at reference numeral 858 (e.g., wherein the one or more ECC components correct the errors associated with the second data block). Likewise, the disclosed subject matter contemplates that the act(s) in reference to reference numeral 860 can be performed sequentially or at the same or substantially the same time as the act(s) performed at reference numeral 862 (e.g., as respectively described herein with reference numeral 856 and reference numeral 858).

Returning back to reference numeral 858 and reference numeral 862, after the one or more ECC components and the optimized correction component correct the respective errors associated with the first data block and the second data block, the corrected data associated with the first data block and the corrected data associated with the second data block can be presented to the requesting entity/device. At this point, methodology 850 can end.

Figure 9:
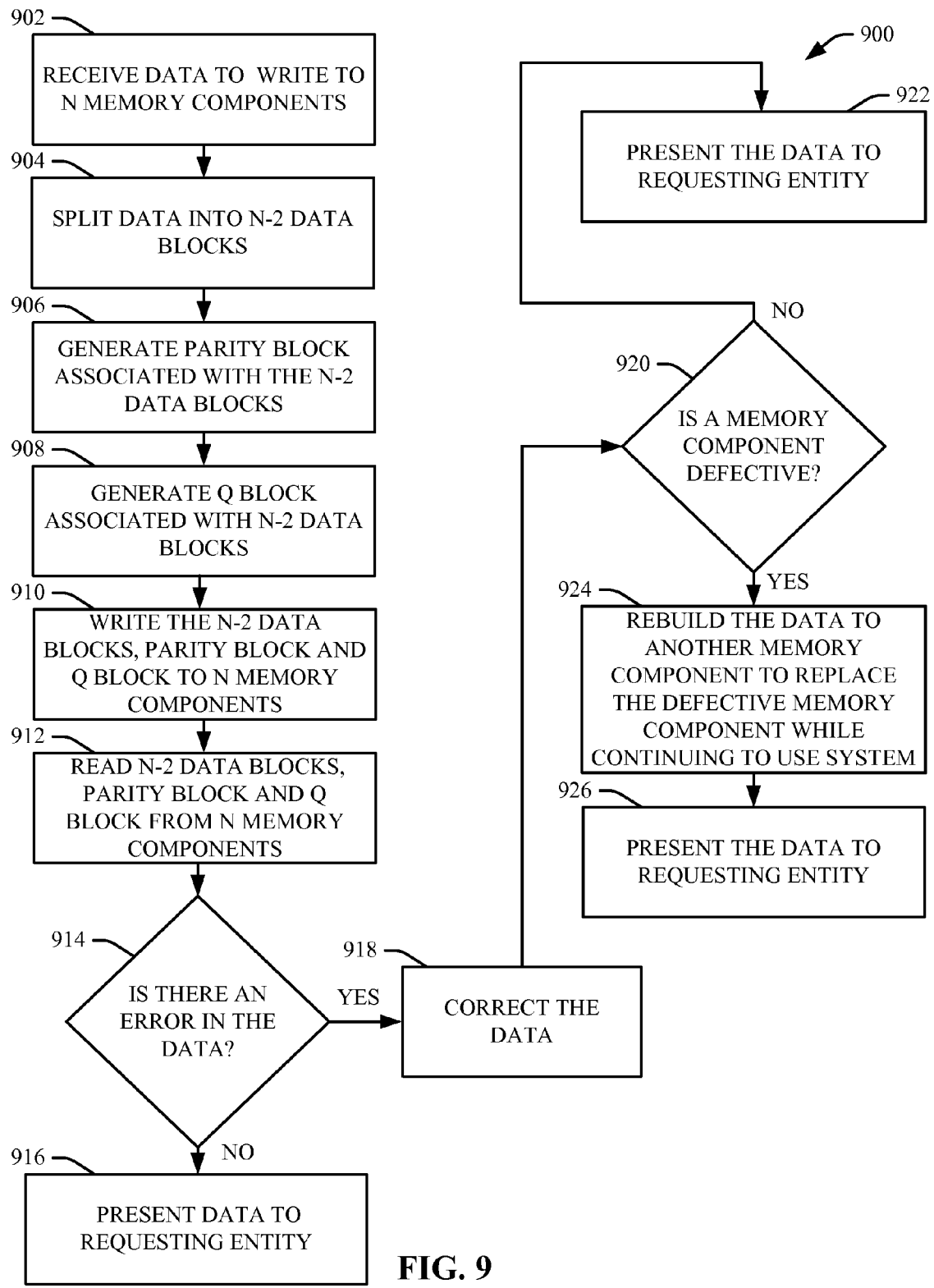
FIG. 9 illustrates a methodology that can facilitate correcting data errors in accordance with an aspect of the disclosed subject matter.

Referring to FIG. 9, a methodology 900 that can that can facilitate correcting data errors in accordance with an aspect of the disclosed subject matter is illustrated. At 902, data can be received to be distributed to Y memory components. For example, a memory controller component (e.g., memory controller component 102 of FIG. 1) can receive data to be transmitted to Y memory components (e.g., Y memory components 104 through 110 of FIG. 1, memory components 402 through 408 of FIG. 4).

At 904, the data can be divided into subsets of data that can be stored in Y−2 data blocks, wherein Y can represent the number of memory components associate with the memory controller component. In accordance with one aspect of the disclosed subject matter, an optimized correction component (e.g., optimized correction component 112 of FIG. 1) can split the data into Y−2 blocks.

At 906, a parity block that can be associated with the Y−2 data blocks can be generated. In accordance with one aspect of the disclosed subject matter, the optimized correction component in coordination with a parity component (e.g., parity component 204 of FIG. 2) can generate the parity block (e.g., as explained in system 200). Then, at 908, a corresponding Q block can be generated. In one aspect, the optimal correction component, the parity component, a processor (e.g., processor component 202 of FIG. 2) can facilitate transferring the Y−2 data blocks and associated parity block to a Q component (e.g., Q component 302 of FIG. 3), wherein the Q component can generate the Q block (e.g., as described in system 300).

At 910, the Y−2 data blocks, the parity block, and the Q block can be written to Y memory components. For example, the optimized correction component and/or the processor can write the Y−2 data blocks and the redundancy blocks (e.g., the parity block and the Q block) to the Y of memory components.

At 912, the Y−2 data blocks and the redundancy blocks can be read from the Y memory components. In accordance with one aspect of the disclosed subject matter, a read operation to read the Y−2 data blocks and the redundancy blocks (e.g., a parity stripe) can be facilitated by the optimized correction component 112 and/or a processor (e.g., processor component 202 of FIG. 2), for example.

At 914, a determination can be made as to whether or not one or more of the data blocks contain data that has an error. In accordance with one aspect of the disclosed subject matter, an ECC component (e.g., one of the ECC components 206 through 212 of FIG. 2) can determine if one of the data blocks contain data that has an error. Further, the ECC component can determine the number of errors that are associated with the data in the data block(s). If it is determined that there are no errors associated with any of the data blocks, then, at 916, the data (e.g., the original Y−2 data blocks) can be presented to the requesting entity/device.

Referring back to reference numeral 914, if it was determined that one or more of the data blocks do contain data that has an error, at 918, the data that contains errors can be corrected. For example, if more than two of the data blocks contain contains data that has error(s), then one or more of the ECC components can correct the errors associated with the data in the data blocks. In accordance with one aspect of the disclosed subject matter, the ECC components can correct the errors contained in the data of one of the data blocks and the optimized correction component perform corrections on the remainder of the data in the data blocks that contain errors (e.g., if there are two or less remaining data blocks that have data that contain errors). In accordance with another aspect of the disclosed subject matter, the ECC component can instruct the optimized correction component in conjunction with the parity component and/or the Q component to correct the errors (e.g., if the number of errors is at or more than a predetermined threshold number of errors associated with the data).

At 920, a determination can be made as to whether a memory component is defective. In accordance with one aspect of the disclosed subject matter, the ECC component, the optimal correction component, the processor or a combination thereof can track and analyze the number of errors that are associated with one or more of the memory components associated with the memory controller component, for example. By analyzing this information, the ECC component, the optimal correction component, the processor or a combination thereof can facilitate generating an indicator that one of the memory components may potentially be defecting. For example, one or more indicator signal(s) can be used to provide information regarding whether one of more of the memory components are potentially defective. If it is decided that there are no defective memory components, then, at 922, the data can be presented to the requesting entity/device.

Referring back to reference numeral 920, if it is determined that a memory component is defective, at 924, the data that was contained in the memory component can be rebuilt and placed into another memory component. For example, the optimized correction component in conjunction with the parity component and/or the Q component can regenerate the data that was contained in the defective memory component. It is to be appreciated that if a memory controller component that utilizes two redundancy blocks (e.g., a parity block and a Q block), that the data contained in up to two memory components can be rebuilt/reconstructed in the event of one or two memory components become defective. In accordance with one aspect of the disclosed subject matter, there may be an extra memory component available wherein the rebuilt data can be stored. In accordance with another aspect of the disclosed subject matter, the defective memory component can be replaced (e.g., by a user) and the rebuilt data can be stored into the memory component that replaces the defective memory component. It is to be appreciated that the memory controller component can continue to operate when one of the memory components is defective and while the data that was stored in the defective memory component is being rebuilt.

At 926, the data can be presented to the requesting entity/device. At this point, methodology 900 can end.

Figure 10:
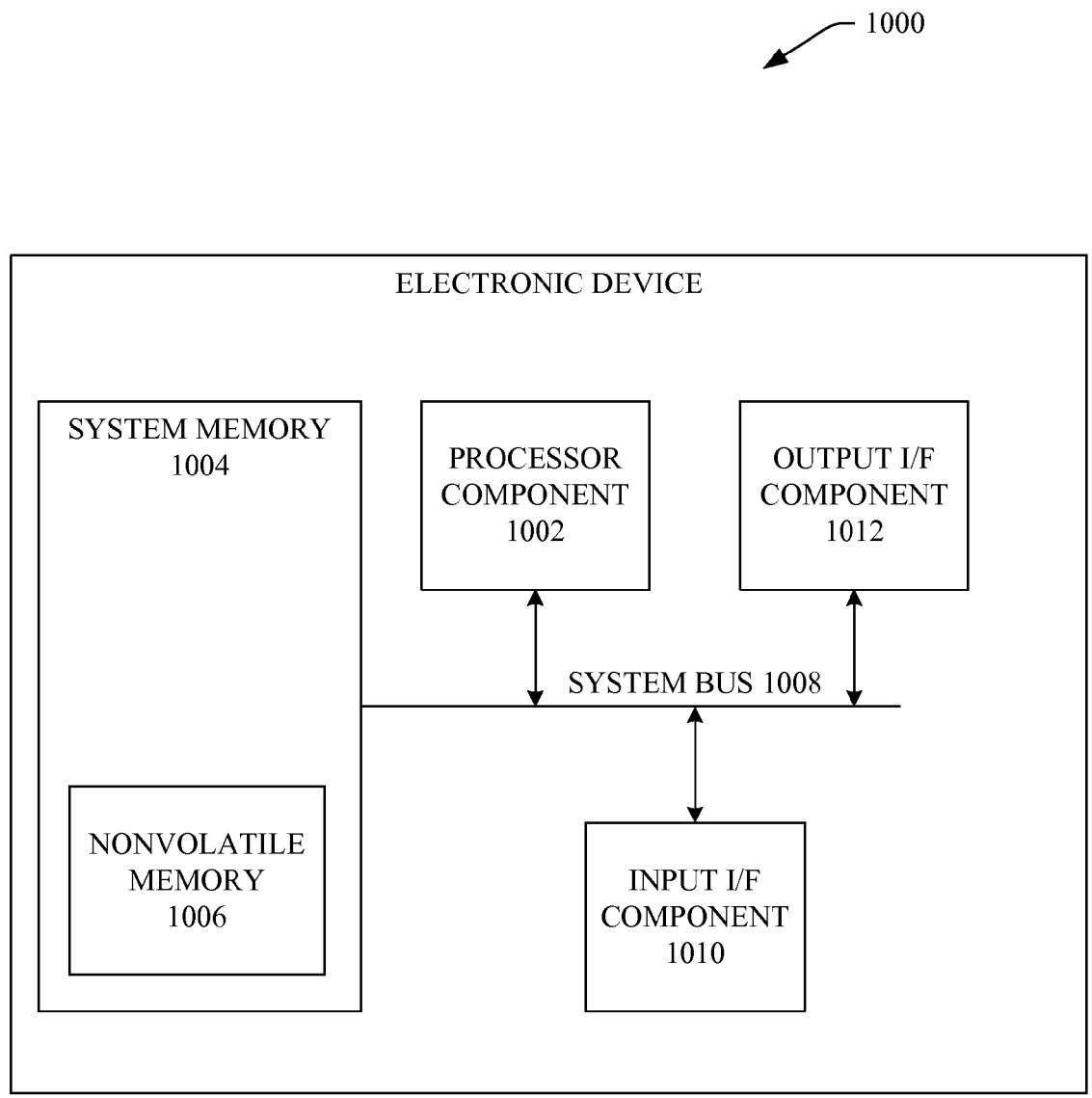
FIG. 10 is a block diagram of an exemplary electronic device that can employ an array of memory components.
Figure 11:
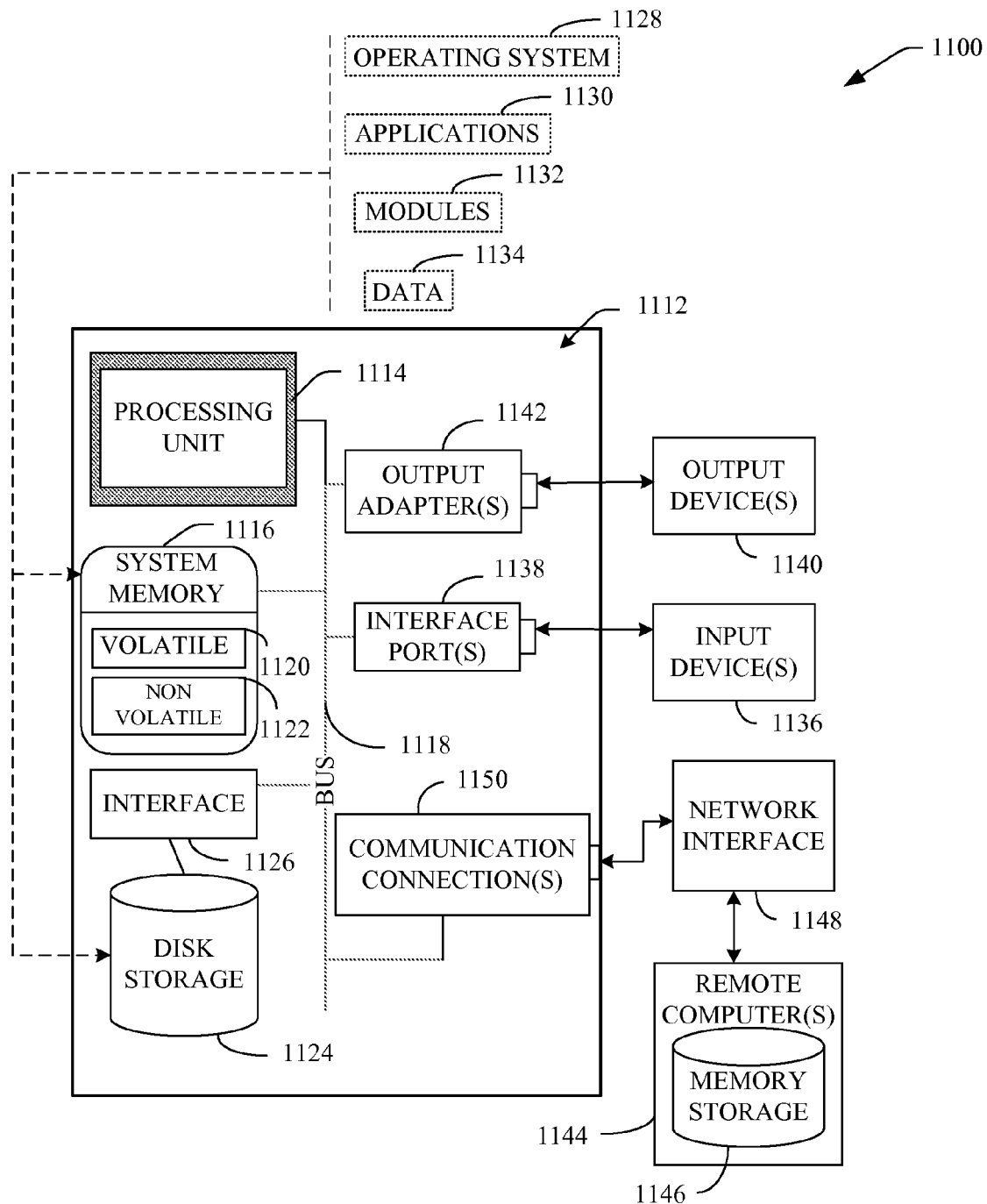
FIG. 11 is a schematic block diagram illustrating a suitable operating environment in which one or more memory component can be employed.

In order to provide a context for the various aspects of the disclosed subject matter, FIGS. 10 and 11 as well as the following discussion are intended to provide a brief, general description of a suitable environment(s) in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

Referring to FIG. 10, illustrated is a block diagram of an exemplary, non-limiting electronic device 1000 that can employ an array of memory components. For example, one or more memory components (e.g., memory components 104 through 110 of FIG. 1 and/or memory components 402 through 408 of FIG. 4) can be associated with the electronic device 1000. The electronic device 1000 can be and/or can include, but is not limited to, network equipment (e.g., routers, access points), a media player and/or recorder (e.g., audio player and/or recorder, video player and/or recorder), a television, a smart card, a phone, a cellular phone, a smart phone, an electronic organizer, a PDAs, a portable email reader, a laptop computers, a digital camera, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system (e.g., global position satellite (GPS) system), secure memory devices with computational capabilities, a device with a tamper-resistant chip(s), an embedded computer in a machine (e.g., an airplane, a copier, a motor vehicle, a microwave oven), and the like.

Components of the electronic device 1000 can include, but are not limited to, a processor component 1002, a system memory 1004 (with nonvolatile memory 1006), and a system bus 1008 that can couple various system components including the system memory 1004 to the processor component 1002. The nonvolatile memory 1006 can be, for example, an array of one or more memory components (e.g., memory components 104 through 110 of FIG. 1 and/or memory components 402 through 408 of FIG. 4). The system bus 1008 can be any of several types of bus structures including a memory bus or memory controller, a peripheral bus, or a local bus using any of a variety of bus architectures.

Electronic device 1000 can typically include a variety of computer readable media. Computer readable media can be any available media that can be accessed by the electronic device 1000. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, electrically erasable programmable ROM (EEPROM), nonvolatile memory 1006 or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1000. Communication media typically embodies computer readable instructions, data structures, program modules or other data in a modulated data signal such as a carrier wave or other transport mechanism and includes any information delivery media.

The system memory 1004 includes computer storage media in the form of volatile and/or nonvolatile memory such as nonvolatile memory 1006. A basic input/output system (BIOS), containing the basic routines that help to transfer information between elements within electronic device 1000, such as during start-up, can be stored in memory 1004. System memory 1004 typically also contains data and/or program modules that can be immediately accessible to and/or presently being operated on by processor component 1002. By way of example, and not limitation, system memory 1004 can also include an operating system, application programs, other program modules, and program data.

The nonvolatile memory 1006 can be removable or non-removable. For example, the nonvolatile memory 1006 can be in the form of a removable memory card (e.g., SD card, microSD card, SmartMedia) or a USB flash drive. It will be appreciated that, in one embodiment, the nonvolatile memory 1006 can comprise flash memory (e.g., single-bit flash memory, multi-bit flash memory). It is to be further appreciated that, in another embodiment(s), other types of nonvolatile memory, such as electrically erasable memory (e.g., EEPROM), can be utilized instead of or in addition to flash memory. In one embodiment of the disclosed subject matter, the nonvolatile memory 1006 can, for example, have the same or substantially same functionally as the memory component 502 as described in FIG. 5. In accordance with one aspect of the disclosed subject matter, the nonvolatile memory 1006 can be the same as memory components 104 through 110 and/or memory components 402 through 408 as more fully described herein, for example, with regard to system 100, system 200, system 300 and/or system 400.

In one aspect, a user can enter commands and information into the electronic device 1000 through input devices (not shown) such as a keypad, microphone, tablet or touch screen although other input devices can also be utilized. These and other input devices can be connected to the processor component 1002 through input interface 1010 that can be connected to the system bus 1008. Other interface and bus structures, such as a parallel port, game port or a universal serial bus (USB) can also be utilized. A graphics subsystem (not shown) can also be connected to the system bus 1008. A display device (not shown) can be also connected to the system bus 1008 via an interface, such as output interface 1012, which can in turn communicate with video memory. In addition to a display, the electronic device 1000 can also include other peripheral output devices such as speakers (not shown), which can be connected through output interface 1012.

With reference to FIG. 11, system 1100 depicts a suitable operating environment in which one or more memory component can be employed in accordance with an aspect of the disclosed subject matter. The environment 1100 can include a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122, which can have the same or substantially the same functionality as one or more memory components 104 through 110 as described herein with reference to system 100 and/or one or more of the memory components 402 through 408 as described herein with reference to system 400, for example. The basic input/output system (BIOS), containing the basic routines to transfer information between elements within the computer 1112, such as during start-up, is stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. For example, the applications 130 can be a verification program that facilitates the verification and/or optimization of a design (e.g., system component 102 of FIG. 5) on at least one remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a memory controller component that transmits data;
    a memory array that includes Y memory components associated with the memory controller component, wherein at least one of the Y memory components is employed to store redundancy information associated with the data, wherein Y is an integer number higher than two;
    an optimized correction component that is associated with the memory array and facilitates error correction of the data when the data meets a predetermined error correction criteria; and
    at least one error correction code (ECC) component that corrects data errors associated with the data when the data is read from the Y memory components and the data does not meet the predetermined error correction criteria,
    wherein the Y is an integer number higher than three,
    wherein the optimized correction component partitions the data into Y minus 2 (two) data blocks, facilitates the generation of a Q block and a parity block, assembles the Y minus 2 (two) data blocks, the parity block, and the Q block into a data stripe, and utilizes the parity block and the Q block to correct data errors associated with one of the data blocks when the data stripe is read from the Y memory components based in part on the predetermined error correction criteria,
    wherein the predetermined error correction criteria includes at least one of the Y minus 2 (two) data blocks containing data that has a number of errors that is at or more than a predetermined threshold number of errors, wherein the errors include a positive number of data errors of at least two different data blocks.

2. The system of claim 1, wherein the predetermined error correction criteria includes when the data associated with 2 (two) or fewer data blocks of the data stripe contain errors.

3. The system of claim 1, wherein the predetermined error correction criteria includes when the data associated with 2 (two) or fewer data blocks associated with the data stripe contain more than a threshold number of errors, wherein the threshold number of errors is a positive integer.

4. The system of claim 1, further comprising:
    a parity component wherein the parity component facilitates the generation of the parity block; and
    a Q component, wherein the Q component facilitates the generation of the Q block.

5. The system of claim 1, wherein the optimized correction component partitions the data into Y minus 1 (one) data blocks, wherein the optimized correction component facilitates the generation of a parity block, wherein the optimized correction component assembles the Y minus 1 (one) data blocks and the parity block into a data stripe, wherein the data stripe is written to the Y memory components.

6. The system of claim 5, wherein the optimized correction component utilizes the parity block to correct data errors associated with data that is read from the Y memory components.

7. The system of claim 5, further comprising a parity component, wherein the parity component facilitates the generation of the parity block.

8. The system of claim 5, wherein the optimized correction component assembles the parity block in a rotating fashion from one data stripe to a next data stripe to evenly distribute parity blocks across the Y memory components.

9. The system of claim 1, wherein the predetermined error correction criteria includes when only 1 (one) data block of the data stripe contains data that contains errors.

10. The system of claim 1, further comprising one or more FIFO components, wherein the FIFO components store one or more data blocks associated with a data stripe, one or more parity blocks, or one or more intermediate results associated with the generation of the one or more parity blocks.

11. The system of claim 1, wherein the at least one ECC component includes error correction codes that correct the data errors associated with a data block within a data stripe.

12. The system of claim 1, wherein the at least one ECC component determines whether the error correction criteria is met.

13. The system of claim 12, further comprising an indicator component communicatively coupled to the optimized correction component that notifies the optimized correction component to correct the data errors when the error correction criteria is met.

14. A method, comprising:
    reading two or more data blocks and a parity block associated with a data stripe from three or more memory components, wherein each of the two or more data blocks and the parity block are stored in three or more respective memory components;
    correcting at least one error associated with at least one of the two or more data blocks based in part on a predetermined error correction criteria wherein the parity block facilitates correcting the at least one error if the predetermined error correction criteria is met and correcting the at least one error by an error correction code (ECC) component if the predetermined error correction criteria is not met, generating a Q block from the two or more data blocks;

assembling the two or more data blocks, the parity block and the Q block to form a data stripe; and correcting at least one error associated with at least one of the two or more data blocks, wherein the Q block, the parity block or a combination thereof facilitates the correcting of the at least one error associated with at least one of the two or more data blocks, wherein the predetermined error correction criteria comprises the at least one of the two or more data blocks containing data that has a number of errors that is at or more than a predetermined threshold number of errors, wherein the errors include a positive number of data errors of at least two different data blocks.

15. The method of claim 14, further comprising:

creating the two or more data blocks from received data;

generating a parity block from the two or more data blocks;

assembling the two or more data blocks and the parity block to form a data stripe; and writing the data stripe to three or more memory components.

16. The method of claim 14, wherein the predetermined error correction criteria comprises at least one of the two or more data blocks associated with the data stripe contains data that has a number of errors that is greater than a predetermined threshold number of errors.

17. The method of claim 14, further comprising:

reconstructing the data stripes associated with at least one defective memory component;

installing at least one replacement memory component to replace the at least one defective memory component; and writing the data stripes associated with the at least one defective memory component into the at least one replacement memory component.

18. The method of claim 14, further comprising:

correcting the at least one other error of the at least one other data block in parallel with correcting the at least one error associated with the at least one data block of the two or more data blocks.

* * * * *